(12) United States Patent
Wisnia et al.

(10) Patent No.: US 10,425,620 B2
(45) Date of Patent: Sep. 24, 2019

(54) VEHICLE CAMERA PERIPHERAL

(71) Applicant: Light Wave Technology Inc., St-Laurent (CA)

(72) Inventors: Jack Wisnia, Dollar-des Ormeaux (CA); Feng Du, Kirkland (CA)

(73) Assignee: LIGHT WAVE TECHNOLOGY INC., St-Laurent, QC (CA)

( * ) Notice: Subject to any disclaimer, the term of this patent is extended or adjusted under 35 U.S.C. 154(b) by 0 days.

(21) Appl. No.: 15/746,125

(22) PCT Filed: Mar. 2, 2017

(86) PCT No.: PCT/CA2017/050285
§ 371 (c)(1),
(2) Date: Jan. 19, 2018

(87) PCT Pub. No.: WO2017/177311
PCT Pub. Date: Oct. 19, 2017

(65) Prior Publication Data
US 2019/0037180 A1    Jan. 31, 2019

Related U.S. Application Data

(60) Provisional application No. 62/323,031, filed on Apr. 15, 2016.

(30) Foreign Application Priority Data

Jun. 17, 2016   (WO) ................ PCT/CA2016/050710
Jul. 11, 2016   (WO) ................ PCT/CA2016/050809

(51) Int. Cl.
*H04N 7/18*   (2006.01)
*B60R 11/04*   (2006.01)
(Continued)

(52) U.S. Cl.
CPC ............ *H04N 7/183* (2013.01); *B60R 11/04* (2013.01); *B60R 13/105* (2013.01);
(Continued)

(58) Field of Classification Search
CPC . B60R 11/04; B60R 13/105; B60R 2300/406; B60R 2011/004; H04N 7/183; H04N 5/23203; H04W 4/80
See application file for complete search history.

(56) References Cited

U.S. PATENT DOCUMENTS 5,774,841 A    6/1998  Salazar et al.
7,245,207 B1 * 7/2007  Dayan ................ B60R 11/0235
                                                  340/435

(Continued)

FOREIGN PATENT DOCUMENTS

WO    WO 2013/121435 A1    8/2013
WO    WO 2013/179637 A1    12/2013

OTHER PUBLICATIONS

PCT/CA2017/050285 Search report.
(Continued)

*Primary Examiner* — Neil R Mikeska
(74) *Attorney, Agent, or Firm* — Anglehart et al.

(57) ABSTRACT

A vehicle camera peripheral. It has a frame having a surface for supporting a license plate, at least one compartment for containing a battery and a circuit board having a wireless transmitter and video transmission circuitry, the compartment provided in the frame and positioned behind the license plate supporting surface, a camera mounted to the frame and connected to the circuit board, and a mounting for connecting the frame to existing license plate fastening devices of a vehicle.

14 Claims, 18 Drawing Sheets

(51) Int. Cl.
  *B60R 13/10* (2006.01)
  *H04W 4/80* (2018.01)
  *H04L 29/06* (2006.01)
  *H04M 1/725* (2006.01)
  *H04N 5/232* (2006.01)
  *B60R 11/00* (2006.01)

(52) U.S. Cl.
  CPC ........ *H04L 65/602* (2013.01); *H04M 1/7253* (2013.01); *H04N 5/23203* (2013.01); *H04W 4/80* (2018.02); *B60R 2011/004* (2013.01); *B60R 2300/406* (2013.01)

(56) References Cited

U.S. PATENT DOCUMENTS

| | | | |
|---|---|---|---|
| 7,629,963 | B1 | 12/2009 | Wright |
| 7,975,017 | B1 | 7/2011 | Kuzkin et al. |
| 8,010,630 | B2 | 8/2011 | Barreto et al. |
| 8,194,132 | B2 | 6/2012 | Dayan et al. |
| 8,204,498 | B1 | 6/2012 | Smith et al. |
| 8,407,291 | B1 | 3/2013 | Irwin et al. |
| 8,855,719 | B2 | 10/2014 | Jacobsen et al. |
| 9,169,684 | B2 * | 10/2015 | Fan ................. E05F 15/77 |
| 9,311,167 | B2 | 4/2016 | Kim et al. |
| 10,166,949 | B1 * | 1/2019 | Selim ................. B60R 25/102 |
| 2002/0123893 | A1 | 9/2002 | Woodward |
| 2003/0133014 | A1 | 7/2003 | Mendoza |
| 2004/0077349 | A1 | 4/2004 | Barak et al. |
| 2005/0165609 | A1 | 7/2005 | Zuberec et al. |
| 2005/0283661 | A1 | 12/2005 | Wong et al. |
| 2006/0098094 | A1 | 5/2006 | Lott |
| 2007/0152811 | A1 | 7/2007 | Anderson |
| 2007/0219686 | A1 | 9/2007 | Plante |
| 2008/0250485 | A1 | 10/2008 | Schreyer et al. |
| 2009/0187687 | A1 | 7/2009 | Hulbert et al. |
| 2009/0244282 | A1 | 10/2009 | Eguiguren |
| 2009/0307679 | A1 | 12/2009 | Lee et al. |
| 2010/0214212 | A1 | 8/2010 | Chen et al. |
| 2010/0261507 | A1 | 10/2010 | Chang et al. |
| 2011/0004888 | A1 | 1/2011 | Srinivasan et al. |
| 2011/0145926 | A1 | 6/2011 | Dalcher et al. |
| 2011/0153207 | A1 * | 6/2011 | Suzaki ................. G01C 21/26 701/532 |
| 2011/0246753 | A1 | 10/2011 | Thomas |
| 2011/0252384 | A1 | 10/2011 | Calman et al. |
| 2012/0109406 | A1 | 5/2012 | Yousefi et al. |
| 2012/0197484 | A1 | 8/2012 | Nath et al. |
| 2012/0256541 | A1 | 10/2012 | Dandrow |
| 2013/0046421 | A1 * | 2/2013 | El Fassi ................. B61L 3/127 701/2 |
| 2013/0130777 | A1 | 5/2013 | Lemay et al. |
| 2013/0144629 | A1 | 6/2013 | Johnston et al. |
| 2013/0278484 | A1 | 10/2013 | Hwang et al. |
| 2013/0307796 | A1 | 11/2013 | Liu et al. |
| 2013/0321629 | A1 | 12/2013 | Zhang et al. |
| 2014/0154648 | A1 | 6/2014 | Gonsalves et al. |
| 2014/0173355 | A1 | 6/2014 | Aasheim et al. |
| 2014/0208170 | A1 | 7/2014 | Simons et al. |
| 2014/0282046 | A1 | 9/2014 | Gonsalves et al. |
| 2014/0365214 | A1 | 12/2014 | Bayley |
| 2015/0015479 | A1 | 1/2015 | Cho |
| 2015/0035646 | A1 | 2/2015 | Han |
| 2015/0085127 | A1 | 3/2015 | Kramer et al. |
| 2015/0126174 | A1 | 5/2015 | Gray |
| 2015/0195518 | A1 | 7/2015 | Shikii et al. |
| 2015/0294398 | A1 | 10/2015 | Khalid et al. |
| 2015/0312572 | A1 | 10/2015 | Owen |
| 2015/0319178 | A1 | 11/2015 | Desai et al. |
| 2015/0352953 | A1 | 12/2015 | Koravadi |
| 2015/0359466 | A1 | 12/2015 | Tilvis et al. |
| 2015/0381859 | A1 * | 12/2015 | Cover ................. H04N 5/2252 348/374 |
| 2016/0036894 | A1 | 2/2016 | Collins et al. |
| 2016/0062721 | A1 | 3/2016 | Marcos et al. |
| 2016/0085602 | A1 | 3/2016 | Jacobson et al. |
| 2016/0098362 | A1 | 4/2016 | Summers |
| 2016/0127693 | A1 | 5/2016 | Chung |
| 2016/0255249 | A1 * | 9/2016 | Pan ................. G03B 17/561 348/373 |
| 2017/0028935 | A1 | 2/2017 | Dutta et al. |
| 2017/0297489 | A1 * | 10/2017 | Fendt ................. B60R 1/00 |
| 2019/0027184 | A1 * | 1/2019 | Ross ................. G11B 27/11 |

OTHER PUBLICATIONS

PCT/CA2017/050285 written opinion.
Core Bluetooth Background Processing for iOS Apps, copyright 2012 apple inc. online, retrieved Sep. 15, 2017 from developer.apple.com.
PCT/CA2017/050809 written opinion.
PCT/CA2017/050809 international search report with related claims.
PCT/CA2017/050285 IPRP.
PCT/CA2017/050740 international search report with related claims.
PCT/CA2017/050740 written opinion.
PCT/CA2017/050837 IPRP.
PCT/CA2017/050837 International search report with related claims.
PCT/CA2017/050837 written opinion.
PCT/CA2017/050839 international search report with related claims.
PCT/CA2017/050839 written opinion.
U.S. Appl. No. 15/655,054 office action dated Nov. 17, 2017.

* cited by examiner

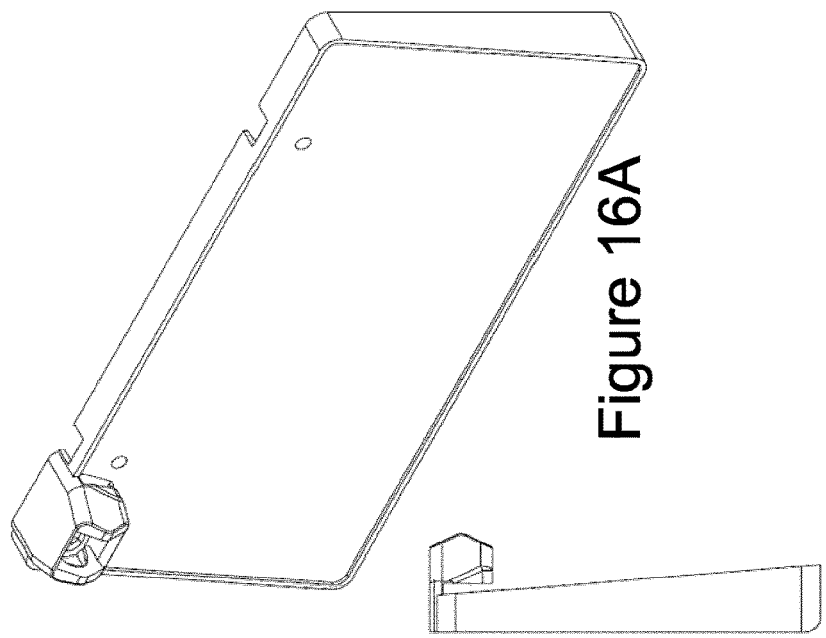
Figure 16A
Figure 16F
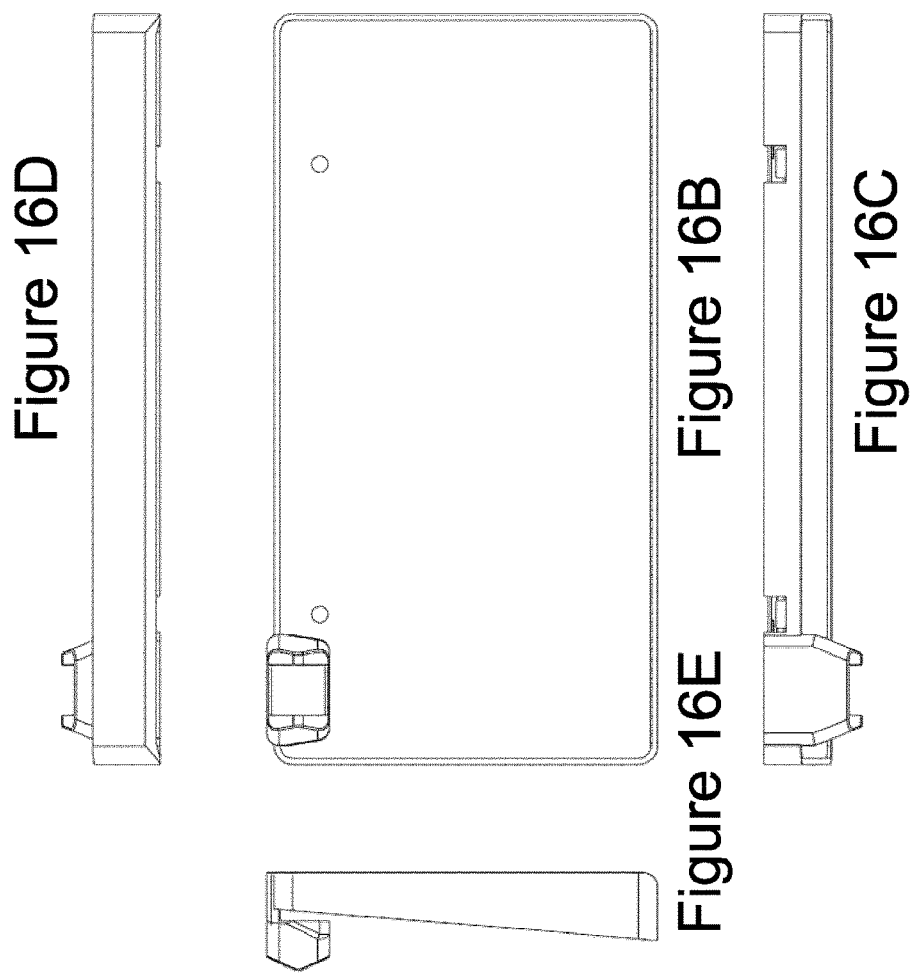
Figure 16D
Figure 16B
Figure 16C
Figure 16E

VEHICLE CAMERA PERIPHERAL

This application claims priority of U.S. provisional patent application 62/323,031 filed Apr. 15, 2016, of PCT/CA2016/050710 filed Jun. 17, 2016, and of PCT/CA2016/050809 filed on Jul. 11, 2016.

TECHNICAL FIELD

The present application relates to a vehicle camera peripheral system, such as a rear view camera for automobiles, trucks or buses. The present application also relates to such peripheral systems that use a smartphone as the video display device.

BACKGROUND

Vehicle cameras are commonly used for viewing an area immediately behind a rear bumper to see what might be behind the vehicle when backing up for parking. The aftermarket camera component is typically mounted to a license plate mounting of the vehicle. Vehicle cameras can also be useful for school buses to see if a child or object is in front of the bus or near the rear wheels of the bus. Similar uses can exist for semi-trailers, heavy trucks, snow removal equipment, etc. where the driver or operator needs improved vision around the vehicle.

Smartphones can have excellent computing capabilities and can be useful as a user interface for a variety of peripherals or uses. One example is an automotive rear view camera application. A wireless camera can be mounted at a rear of a vehicle to transmit images to a smartphone having a wireless data interface to provide a display of the images to the driver. Such cameras are useful for guiding a driver to back up a vehicle. Such rear view automotive cameras are typically wired into electrical power of the vehicle, this requires a modification that normally involves a professional installer. The requirement for professional installation can be a disincentive for consumers to purchase vehicle camera peripherals.

When a rear view camera is powered by a vehicle's backup lamp power, then the camera is powered only when a vehicle is in reverse. While this involves a wired installation, this resolves the issue of triggering of the camera to operate when needed. Other wired installations have the camera always transmit the video, while the display device is controlled to be on or off.

When using a smartphone as the display device, the smartphone needs to be placed in a state in which it is able to run software to display the video. In known systems, this involves typically a user selecting the app and running it in the foreground.

The camera peripheral also needs to be triggered to operate if it is desired for it to be normally in a low power or off state except when the camera needs to be viewed.

With the Google Android® operating system, a program or app can be given by the user special permission to run in the background, such that when video is transmitted from a camera to the smartphone the latter can respond by displaying the video. With the current Apple iOS® operating system, an app cannot be given permission to run continuously in the background. Furthermore, a background app in iOS cannot use the display for presenting the camera video. iOS® devices represent a significant portion of mobile computing devices in use that are suitable to display camera video, and thus it is a problem that user input is required with iOS® devices to allow camera video to be displayed when it is time to display the video.

SUMMARY

Applicant has developed a number of improvements in a vehicle camera peripheral that is to be used with a smartphone for displaying the camera video. In this application, "smartphone" is intended to mean a mobile computing device that includes mobile telephones, handheld computers and tablet computers.

In one improvement, the vehicle camera peripheral is battery powered so that installation does not involve wiring and can be easily done by a consumer. In these embodiments, the camera peripheral may use Bluetooth classic for wireless transmission of video to the smartphone. Bluetooth BLE may be used to communicate with the smartphone, prompting the smartphone to run an application program to verify if any user activation input has been registered by or provided to the smartphone.

BLE should be understood herein to mean the current Bluetooth low energy standard, but without limitation thereto, since any suitable Bluetooth or non-Bluetooth wireless protocol can be used.

The BLE component can be powered by the battery continuously while the camera and video transmission circuitry is only powered when needed. The BLE component can control power supplied to the camera and video transmission circuitry. In this improvement, a separate wireless activation unit is provided with the vehicle camera peripheral, and the function of the activation unit is to send a wireless signal that will cause the BLE component of the vehicle camera peripheral to power up the camera and video transmission circuitry. The activation unit can transmit a signal directly to the BLE component of the peripheral, or it can transmit a signal to the smartphone so that it in turn can transmit a signal directly to the BLE component of the peripheral. The activation unit may establish a first wireless connection with the peripheral, and the peripheral may establish a second distinct wireless connection (e.g. Bluetooth connection) with the smartphone. In some examples, the activation unit may instead communicate via radio frequency signals with the peripheral (e.g. over a 915 MHz transmission channel), where the activation signal may be a radio signal.

The activation unit can be mounted to the vehicle using an adhesive mount, bracket, clip or the like so that a user can trigger the wireless signal using a button press. The activation unit can be mounted to a vehicle gear shift to detect putting the vehicle into reverse. The activation unit can be connected so that it senses the vehicle's powering of the backup lamps. Such an activation unit can be essentially a battery powered BLE component that is configured to send a signal when its button is pressed or it otherwise detects a need for triggering the camera function. In the case of a transport trailer or school bus, the activation unit could trigger from different lamps circuits, such as turn signals or passenger door lights.

By providing an activation unit, triggering of the vehicle camera to operate is made efficient for the operator since it does not involve calling up an app on the smartphone, and because the vehicle camera peripheral can have its camera and video transmission functions triggered by the activation unit, the peripheral can be efficiently powered using batteries and thus avoid a wired installation.

The activation unit can also comprise an app running in the smartphone that detects user input. For example, Applicant has found that the app can read data from a smartphone's proximity sensor indicating a hand position near the proximity sensor, interpreted as a signal to activate the peripheral. Moreover, Applicant has found that the reading of a smartphone's accelerometer data can detect finger taps against the smartphone body that can be discriminated from vehicle vibrations and movements or screen touches.

In the case of an operating system that restricts the ability of an app to run in the background, such as the iOS® operating system, the background app can be activated by BLE messages. iOS® allows a background app to request the operating system to allow it to run when a message is received from a connected BLE device. The peripheral can then be used to send BLE messages on a regular basis to the smartphone so that the smartphone operating system maintains the background app running. The background app can then detect user input and respond to it by sending a message that would cause the camera peripheral to begin operation.

In the case of an operating system that restricts the ability of an app running in the background from displaying video, Applicant has also discovered that a BLE keyboard connection can be used to send keyboard commands either from the camera peripheral or from an external activation unit to the smartphone to cause a video display app to run in the foreground. While the Android® operating system can allow a background app to move into the foreground, display video while in the background, or to display video on the lock screen of the device, the iOS® operating system requires the smartphone to be unlocked and for the app providing the video display to be running in the foreground. Such keyboard commands can be used to place the smartphone in a state ready to display the video with no or very little user interaction. For example, the current iOS® version causes a dialog box to appear to require user screen touch input when a wireless keyboard command attempts to change the foreground app. Thus, a single touch by a user on the screen of the iOS device can allow wireless keyboard commands to cause the smartphone to begin displaying camera video.

Applicant has discovered that a battery powered camera can be powered off with only a Bluetooth bridge left active with the viewing device controlling the power state of the camera unit to turn on using user input from a separate battery-powered activation unit. In the case of a vehicle camera, the activation unit is located within the easy control reach of the driver of the vehicle, and allows the driver to control the vehicle camera while driving.

In some embodiments, a separate activation unit is provided that is paired with the smartphone for issuing Bluetooth keyboard commands so as to cause the smartphone to go into a desired state. When this activation unit is used with a Bluetooth peripheral, such as a camera, the activation unit or the smartphone can cause the camera unit to wake up by Bluetooth communication in the case that the camera unit was in a sleep mode. The configuration of the Bluetooth keyboard commands in the peripheral device that sends them to the smartphone to cause the desired app to be called up can be done using a utility that is part of the desired app itself that works with the peripheral or using a separate configuration app on the same smartphone. Alternatively, a separate programming mechanism can be used to set the commands.

In some embodiments, the peripheral device can be powered by a controllable power source. In the case of a rear view camera, power can conveniently be taken from the back up lights and controlled by the gear shifter being put into reverse gear. The placing of the gear shift lever into reverse powers up the camera unit, and the camera unit can send Bluetooth HID commands (normally for iOS devices) or other commands such as custom commands (normally for Android devices) to the smartphone to cause the camera app to be called up.

In accordance with one broad aspect of some embodiments, there is provided an automobile rear view camera device having a wireless module, a consumer control key sequence memory and interface unit connected to said wireless module and configured to store consumer control key codes (or descriptors), a consumer control key transmission module configured for automatically transmitting at least one consumer control key code or descriptor from said consumer control key sequence memory on powering on of said device using said Bluetooth module, a rear view camera, and a video transmission module connected to the camera and the wireless module for transmitting images from the camera. The consumer control key sequence interface unit may also be configured to receive keyboard command configuration data from the smartphone, for configuring the keyboard commands that are stored in computer readable memory. For instance, the keyboard command configuration data may provide the keyboard command configuration data specific to a designated unlocking sequence for a smartphone, updating the unlocking keyboard command configuration data as the unlocking sequence changes.

In accordance with another broad aspect of some embodiments, there is provided a handheld computer having a wireless data module for communicating with an automobile rear view camera device, an operating system based consumer control key module for interpreting a consumer control key code or descriptor received from the device by the wireless data module to generate operating system control commands, an operating system app launch module responsive to the control commands for launching a rear view camera application program stored in a memory on the handheld computer, a consumer control key descriptor set up module associated with the rear view camera application program for transmitting consumer control key data to the camera device using the wireless module, a camera viewer associated with the rear view camera application program for displaying images received from the camera device through the wireless module.

BRIEF DESCRIPTION OF THE DRAWINGS

The invention will be better understood by way of the following detailed description of embodiments of the invention with reference to the appended drawings, in which:

FIG. 16A is an oblique view of the rear-view camera and license plate mounting of FIG. 12 from the outer or front side;

FIG. 16B is a front plan view of the rear-view camera and license plate mounting of FIG. 12;

FIG. 16C is a top plan view of the rear-view camera and license plate mounting of FIG. 12;

FIG. 16D is a bottom plan view of the rear-view camera and license plate mounting of FIG. 12;

FIG. 16E is a right side plan view of the rear-view camera and license plate mounting of FIG. 12; and FIG. 16F is a left side plan view of the rear-view camera and license plate mounting of FIG. 12.

DETAILED DESCRIPTION

The present application teaches of a rear view camera system connectable with a user's smartphone to view the images produced by the camera. As the screen of the smartphone is used to view the images from the camera, the user does not need to purchase or obtain a separate screen device other than the smartphone to view the images produced by the rear view camera. Moreover, the rear view camera system may be activated with minimal or no user input performed on the smartphone. Therefore, the present rear view camera system offers a means for a user to easily view the images produced by the rear-view camera without having to navigate through the smartphone to, for instance, launch the viewing app (e.g. unlocking the phone, searching for the viewing app, launching the viewing app), undesirable when the user needs to back-up quickly or to rapidly identify what is located being the vehicle. As such, the present rear view camera system may be activated by a simple double-tap performed by the user on the smartphone's frame, pressing a button that is part of an activation unit, or placing the gear shift in reverse, as is further described herein.

Certain Definitions

While in this description reference is made to Bluetooth wireless transmission, it is to be understood that this is a commonly used wireless transmission protocol. It will be appreciated that any suitable wireless transmission protocol can be applied to variant embodiments herein.

While in this description reference is made to iPhone, a smartphone designed by Apple Inc. of California, it is intended that the device 12 can be any electronic device, such as a laptop or desktop computer, a smart phone or a tablet computer, such as an iPhone, iPod touch, Android tablet or Android smart phone, GPS unit, display and the like.

Figure 1:
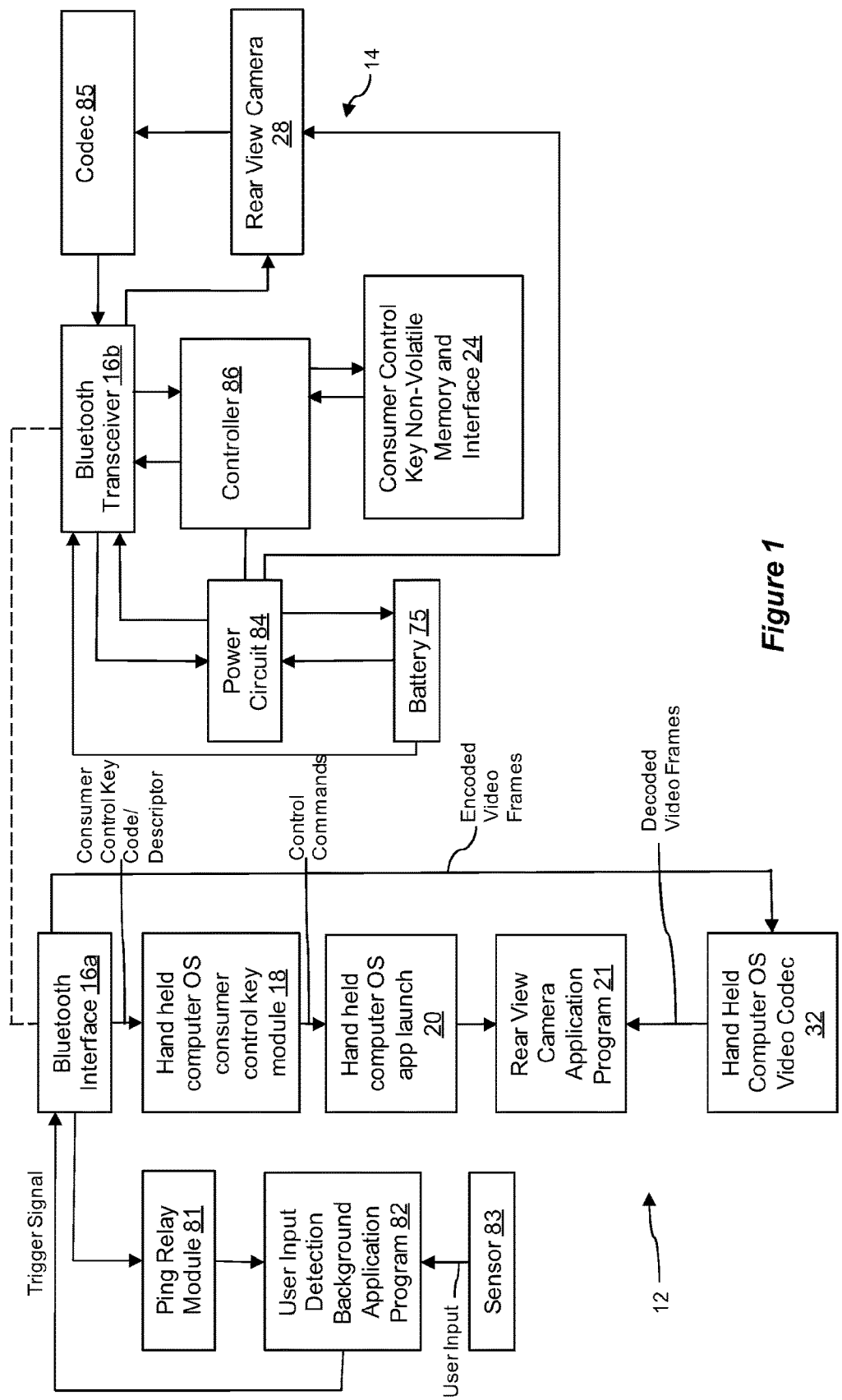
FIG. 1 is a block diagram illustrating a rear view camera system paired with a smartphone, where the rear view camera system and the smartphone share a Bluetooth connection, and the rear view camera system is activated as a result of user input received by the smartphone.

Peripheral Activated by User Input on Smartphone:

Reference is now made to FIG. 1, illustrating an exemplary rear view camera peripheral 14 connected to a smartphone 12. In the example of FIG. 1, the exemplary smartphone 12 is one that runs on an iOS device, such as the smartphones designed by Apple Inc. However, it will be appreciated that the peripheral 14 may be used with any other smartphone without departing from the present teachings.

The peripheral 14 has a camera 28 for generating a stream of images. Camera 28 may be digital or analog. The peripheral 14 also has, optionally, a battery 75 and a power circuit 84. In some examples, the peripheral 14 does not run on a battery, but may be, for instance, wired in and powered by the back-up lights of the vehicle. The peripheral 14 also has a Bluetooth transceiver 16*b*. The battery 75 is connected to the power circuit 84 and, in some embodiments, to the Bluetooth transceiver 16*b*. The peripheral 14 also has a controller 86. The peripheral 14 also has a codec 85, for compressing, encoding and transmitting a stream of images received from the camera 28.

Figure 3:
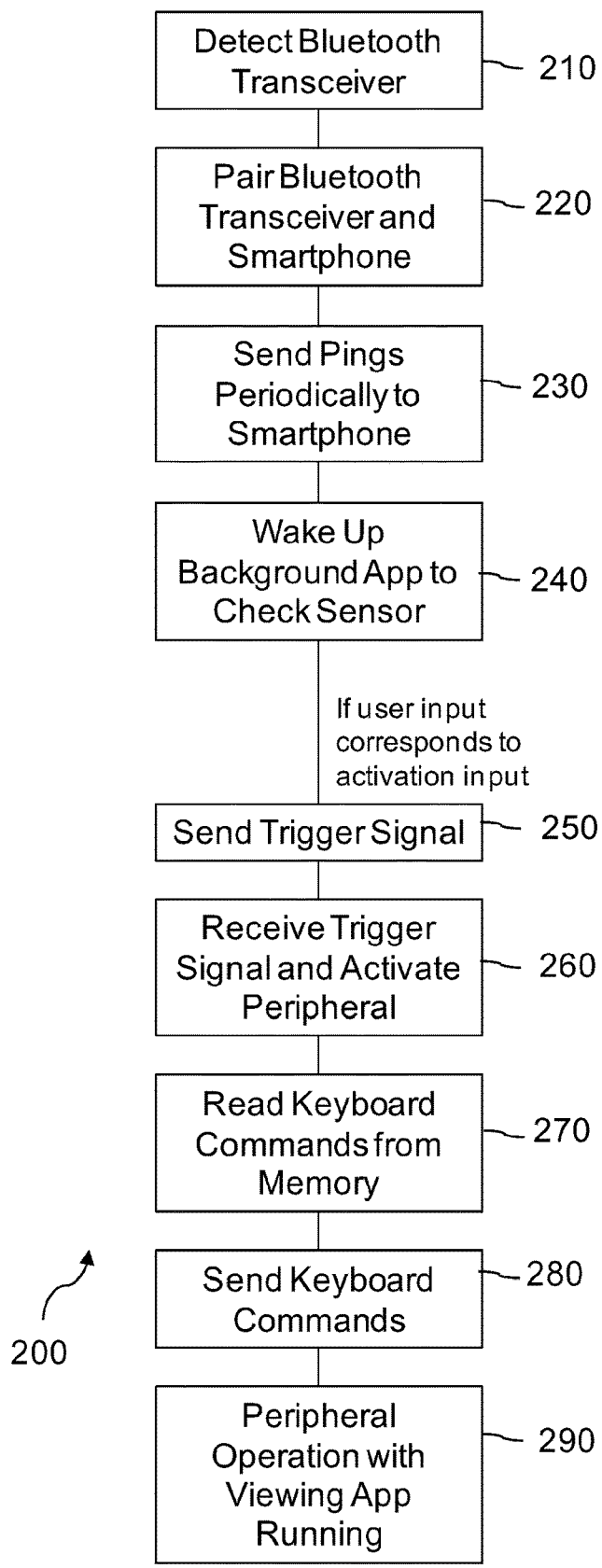
FIG. 3 is a flowchart diagram showing an exemplary method of activating a peripheral system and launching a viewing application program on a smartphone using user input received by the smartphone.

Method of Activating Peripheral and Running the Viewing App:

Reference is now made to FIG. 3, illustrating an exemplary method 200 of activating a peripheral 14 using user input performed on the smartphone 12, the activation of the peripheral causing the smartphone 12 to run a rear view camera application program 21 to display images from the rear view camera 28.

The smartphone 12 first detects the Bluetooth transceiver 16b of the peripheral 14 when the smartphone 12 is in range of the Bluetooth transceiver 16b at step 210. The Bluetooth transceiver 16b may be operating with Bluetooth Low Energy (BLE) technology. Once the Bluetooth transceiver 16b is detected by the smartphone 12, using, for instance, geofencing between the smartphone 12 and the Bluetooth transceiver 16b, the Bluetooth transceiver 16b is paired with the smartphone 12 at step 220, establishing a wireless Bluetooth connection between the smartphone 12, via its Bluetooth interface 16a, and the Bluetooth transceiver 16b. In some embodiments, the smartphone 12 may be placed in the vehicle on a holder having a magnet. The magnetometer of the smartphone 12 (and/or its magnetic field sensors), as is known in the art, detects the presence of the magnet, indicating that the smartphone 12 is positioned in the holder, likely ready to be used in the vehicle. This additional information may be used as an indication to start sending signals to the background application 82 to cause it to wake up, as explained herein.

In some embodiments, once the Bluetooth transceiver 16b is paired with the smartphone 12 (and/or the magnetometer of the smartphone 12 picks up the magnet of the holder of the smartphone 12), the Bluetooth transceiver 16b starts sending signals (e.g. pings) periodically to the smartphone 12, to its Bluetooth interface 16a at step 230. In one embodiment, the Bluetooth transceiver 16b sends a ping every second. The pings are received by the Bluetooth interface 16a, transmitted to the iOS of the smartphone 12 and processed by the iOS. The smartphone 12 has a user input detection background application program 82 for periodically verifying if the user has provided input that corresponds to user input indicating the user's desire to activate the peripheral 14. The activation user input may be defined by the user or pre-configured when the background application 82 is added to the smartphone 12. The background application program 82 may be configured to verify user input data transmitted from a specific sensor 83 of the smartphone 12 (or the background application 82 is configured to retrieve the data from the sensor 83).

In some examples, the sensor 83 in question that is verified by the background application program 82 may be the proximity sensor of the smartphone 12. The proximity sensor, as is known in the art, is able to detect the proximity of nearby objects without any physical contact. The proximity sensor of the smartphone 12 is used to detect when a user's face is near the smartphone 12 during the call in order to avoid performing acts associated with undesirable user taps of the display screen of the smartphone 12 during a call (such as one caused by an ear pressing the screen of the smartphone 12). In some smartphones, the proximity sensor is located at the top of the smartphone.

The proximity sensor may register when an object is in proximity of the smartphone 12, such as a hand positioned over a certain portion of the smartphone 12. If the proximity sensor is located at the top of the smartphone 12, positioning a hand over the top of the smartphone 12 is registered by the proximity sensor. Therefore, after the background application program 82 is woken up by a ping, it may be configured to verify if the proximity sensor has detected as user input a hand near the proximity sensor, or a sequence of an object coming in and out of range of the sensor, such as a sequence consisting of a hand coming into range of the proximity sensor, and then out of range, followed by the hand coming back into range. It will be appreciated that any combination of hand movements (or other movements of the body or of an object) that can be detected by the proximity sensor may be used as activation user input, then retrieved by or transmitted to the background application 82.

In other examples, the sensor 83 may be an accelerometer of the smartphone 12 as is known in the art, measuring changes in velocity (e.g. vibrations) of the smartphone 12. As such, the user input indicative of the user's desire to activate the peripheral 14 may be a double-tap of the frame of the smartphone 12, picked up by the accelerometer. Preferably, the activation user input is selected as one that can be distinguished from those used to activate or function other common application programs found on the smartphone 12. Moreover, it is important that the activation user input is also sufficiently distinguishable from acceleration, deceleration and other motions that a vehicle is subject to (e.g. vibrations caused by hitting a speed bump), so that this input resulting from driving the vehicle is not falsely picked up by the accelerometer of the smartphone 12 as the activation user input. For instance, it has been determined that the accelerometer of an iPhone 6 can sufficiently distinguish the user input of a double tap of its frame from the double tap of the top of its screen, or the motions of the vehicle.

Moreover, the background application 82 may be configured to declare that it supports a Core Bluetooth background execution mode in its Information Property List (Info.plist) file. Therefore, in some embodiments, as the background application 82 is declared as being Bluetooth sensitive, once a ping is received by the smartphone 12 from the Bluetooth transceiver 16b, the iOS wakes up the background application 82 at step 240. The background application 82 stays awake for a certain time following being woken up, and verifies the user input data received from the accelerometer. However, as the pings are sent periodically to wake up the background application 82, each ping keeps, in some embodiments, the background application 82 awake. The background application 82 may include a detection algorithm for analyzing the user input data in order to identify activation user input (e.g. by logging in the user input data, comparing against the other forms of user input registered by the smartphone 12 and the vibrations of the vehicle when moving, and/or identifying if it is comparable to the activation user input). In some embodiments, if the user input data matches the activation user input, then the background application 82 sends a trigger signal to the Bluetooth transceiver at step 250. The trigger signal can be defined as, when the activation user input is a double-tap on the frame of the smartphone:

```
<Trigger>
<Source> double tap on the phone</Source>
</Trigger>
``` or it can be very a binary hex as 2 bytes, where the first byte defines a command and the second the source of the commands, for instance:
0x01—trigger
0x03—double tap on the phone.
In some embodiments, the trigger signal is sent to the Bluetooth transceiver 16b via the Bluetooth interface 16a, communicated through the Bluetooth connection established between the smartphone 12 and the Bluetooth transceiver 16b.

In some embodiments, the background application 82 does not identify if the user input corresponds to the activation user input, instead sending all of the user input received from at least one of the smartphone's sensors to the Bluetooth transceiver 16b (e.g. in the form of a binary hex identifying the type of user input). The Bluetooth transceiver 16b may have an analyzing function for analyzing the user input data received and comparing it with specific activation user input data (e.g. if the Bluetooth transceiver 16b receives a binary hex, the binary hex is compared to establish if it corresponds to that leading to the activation of the peripheral 14).

In some embodiments, once the Bluetooth transceiver 16b receives a trigger signal indicative of user input for activating the peripheral 14, the Bluetooth transceiver 16b prompts the activation of the other components of the peripheral 14 at step 260. In other embodiments, the activation of the other components of the peripheral 14 may be activated following the wireless transceiver 16b receiving an activation signal from an activation unit as described herein (e.g. a button that is pressed by a user, the activation unit sending a wireless activation signal to the peripheral 14 upon the pressing of the button). For instance, the Bluetooth transceiver 16b may signal the activation of the power circuit 84, allowing power from the battery 75 to be sent to the controller 86 and the rear view camera 28. Once the controller 86 is powered, the controller 86 retrieves and reads from non-volatile memory 24 a sequence of keyboard commands at step 270. In the case of the Apple iPhone®, keyboard commands can be used to perform actions that normally are associated with the device's touch screen actions or buttons, as for example, the swipe action to initiate unlocking a locked phone, the pressing of the home button, volume control, etc. Likewise, running a desired app can be implemented by using a keyboard command to initiate a search or find on the smartphone, and then sending keystrokes of the name of the app on the smartphone 12 will cause the desired app 21 to be found, with another keystroke, such as ENTER. Modules 18 and 20 represent parts of the smartphone 12 operating system that process wireless keyboard commands and allow such commands to launch application programs or apps. In the present example of method 200, the sequence of keyboard commands may be those for unlocking the smartphone, searching for an application program 21 for viewing the images originating from the camera 28, and run the viewing application program 21. In some embodiments, the sequence of keyboard commands may be preceded by the sending of at least one character to the smartphone 12 for lighting up the smartphone 12, followed by the sequence of keyboard commands for unlocking the smartphone 12 and running the viewing application program 21. In other embodiments, the sequence of keyboard commands may be limited to those for running the application program 21. For instance, the sequence of keyboard commands, once received by the smartphone 12, may be processed by the OS of the smartphone 12 to cause the application program 21 to run and to present a notification window appearing on the screen of the smartphone 12 when the smartphone 12 is locked. For example, in the case of an iOS device, such as the iPhone 6, the user may swipe to the side the notification box corresponding to app 21 and, by using the iOS device's fingerprint security protocol, unlock the device by presenting the user's fingerprint (or the user may type in the user's unlock code). Once the smartphone 12 unlocked, app 21 begins to run and the display of the smartphone 12 begins to show the images received from the peripheral 14.

The controller 86 then transmits the sequence of keyboard commands to the Bluetooth transceiver 16b. The Bluetooth transceiver 16b transmits the sequence of keyboard commands via the Bluetooth connection to the Bluetooth interface 16a of the smartphone 12 at step 280. The data of the sequence of keyboard commands are processed by modules 18 and 20, and the iOS carries out these commands to, optionally unlock the phone, then search for the viewing application program 21, and run the viewing application program 21.

In the case where the peripheral 14 adheres to Apple's MFi licensing program, the user may be required to select an "allow" button that appears on the display of the smartphone 12 to run the viewing application program 21. Touching the portion of the screen corresponding to the "allow" button may allow the user to run the viewing application program 21. In other embodiments, the pressing of "allow" button may be performed using the AssistiveTouch™ application program of the iOS.

The stream of image data generated by the rear view camera 28 may be optionally encoded and, in some examples, compressed, by the codec 85 (e.g. at different compression rates depending on the available bandwidth). The stream of image data may also be transmitted to the smartphone 12 by the Bluetooth transceiver 16b via the Bluetooth connection between the Bluetooth transceiver 16b and the Bluetooth interface 16a.

The stream of images made be decoded by the smartphone's codec 32, and displayed on the screen of the smartphone 12 using the now active viewing application program 21. In some examples, the background application 82 and the viewing application program 21 are part of the same program. In other examples, they are separate programs.

The peripheral 14 is therefore fully operational with its viewing application program 21 running on the smartphone 12 at step 290.

Turning on the Background Peripheral:

The background application program 82 may be turned off on the smartphone 12, requiring that it is turned on before use. In some embodiments, the BLE-based Bluetooth transceiver 16b may function as a beacon for the smartphone 12. Using geolocation, once the smartphone 12 is in range of Bluetooth transceiver 16b, the background application program 82, having a permission to use the geolocation service, is turned on by the OS of the smartphone 12. Once the smartphone 12 moves out of range of the Bluetooth transceiver 16b, the OS of the smartphone 12 turns off the background application program 82. In other examples, the user may manually turn on the background application program 82 or manually turn off the background application program 82, receiving, for instance, a warning in the form of a message when the background application program 82 is to be or has been turned off.

Peripheral Components:

Reference is made back to the exemplary peripheral of FIG. 1.

The camera 28 and the peripheral 14 can be mounted to the rear license plate mounting of a vehicle. The battery 75 may be contained in the mounting frame. The controller 26, the Bluetooth transceiver 16b, the codec 85, the non-volatile memory 24 and the power circuit 84 may be mounted on a single chip or circuit board (or in some embodiments, on separate chips or circuit boards), and the single chip or circuit board may also be contained within a compartment of the mounting frame. The controller 26 may be a microprocessor (such as a MSP430F5254RGCT) that includes non-volatile memory 24 (including the configuration memory). Non-volatile memory can also be provided using a component separate from the microprocessor. Some models of microprocessors may include a Bluetooth wireless transceiver 16b, while a separate component for such a wireless transceiver (Bluetooth or otherwise) can be provided using a separate IC component (for example, a BLE0202C2P chip and/or a CC2564MODN chip). In some embodiments, the peripheral 14 may have two Bluetooth transceivers, one with BLE (Bluetooth Low Energy) technology, and the other with Bluetooth Classic technology. The BLE chip of the peripheral 14 may connect with the BLE chip of the smartphone 12. However, once the peripheral 14 is activated, then the smartphone 12, having its own Bluetooth Classic chip, establishes a wireless connection with the Bluetooth Classic chip of the peripheral 14. As the Bluetooth Classic chip 14 consumes more energy, but may have greater bandwidth that the wireless connection established between BLE chips, in some examples, it is active only when the peripheral 14 is activated or when prompted to turn on. As such, the Bluetooth Classic connection is used to transmit the stream of image data to the smartphone 12 from the peripheral 14 over its greater bandwidth connection. When the peripheral 14 is shut off, so may the Bluetooth Classic chip return to sleep mode, or shut off, to save power. Once the Bluetooth Classic chip shut off, the BLE chip may remain active, consuming less power, waiting for the smartphone 12 to send a signal triggering a subsequent activation of the peripheral 14. In other embodiments, the wireless transceiver 16b may be a Bluetooth chip operating with low battery consumption and capable of establishing a bandwidth connection comparable with that of Bluetooth Classic technology (in these embodiments, the BLE chip may always be active).

The peripheral 14 is woken up from a low-power sleep state using the Bluetooth transceiver 16b. In some examples, the Bluetooth transceiver 16b is a Bluetooth chip. In some embodiments, the Bluetooth transceiver 16b is connected to the battery 75 (and in some examples, connected to the battery 75 via the power circuit 84), and receives power from the battery 75. The Bluetooth transceiver 16b may be a Bluetooth Low Energy Chip, integrating the BLE wireless personal area network technology or Bluetooth Smart™. The Bluetooth transceiver 16b is also configured to send a ping or signal to the smartphone 12, once the peripheral 14 is paired with the smartphone 12. The Bluetooth transceiver 16b also receives a trigger signal from the smartphone via the wireless connection to activate the peripheral 14. Therefore, the Bluetooth transceiver 16b may cause the power circuit 84 to allow power to run from the battery 75 to the other components of the peripheral 14 (e.g. the rear view camera 28 and the controller 86). The Bluetooth transceiver is also connected to the rear view camera 28 or to the codec 85 and receives a stream of image data (encoded or decoded; compressed or uncompressed), from the rear view camera 28 or the codec 85. The Bluetooth transceiver 16b may then transmit the image data over the wireless connection established with, for instance, the smartphone's Bluetooth interface 16a, to the smartphone 12 for viewing by the user on the smartphone's screen.

In other embodiments, the wireless transceiver 16b may be a wireless USB transceiver.

Consumer control key non-volatile memory and interface 24 is computer readable memory that may store the keyboard commands for at least one activation button, and instructions that are readable and may be executed by the consumer control key transmission module 26 (e.g. memory may store one sequence of keyboard commands associated with one task, or multiple sequences of keyboard commands, each associated to at least one task such as unlocking the smartphone 12, searching for the application program 21, running the application program 21). The consumer control key interface 24 may also be configured to receive wirelessly command key configuration data from the smartphone 12. The command key configuration data may provide information on the sequence of keyboard commands to be stored. Therefore, the smartphone 12 may send information to the peripheral 14 regarding the sequence of keyboard commands to be used. Such may be practical, for instance, when the password to unlock the smartphone 12 changes. The new sequence of characters to unlock the smartphone 12 may be sent by the smartphone 12 to the consumer control key non-volatile memory and interface 24 in the form of command key configuration data, the sequence of keyboard commands stored in consumer control key non-volatile memory and interface 24 updated as a result.

In the examples where there the peripheral 14 has a battery 75, the power circuit 84 is connected to the Bluetooth transceiver 16b and allows power to flow from the battery 75 to the controller 86 and to the camera 28 when a signal is sent by the Bluetooth transceiver 16b to activate the peripheral 14 (or activate the power circuit 84 that in turn activates the other components of the peripheral 14). The power circuit 84 may be a power management integrated circuit. The power circuit 84 may also cease the flow of power from the battery 75 to the controller 86 and to the rear view camera 28 when the power circuit 84 receives a signal from the Bluetooth transceiver 16b to deactivate the power circuit 84 or deactivate the peripheral 14.

Figure 7:
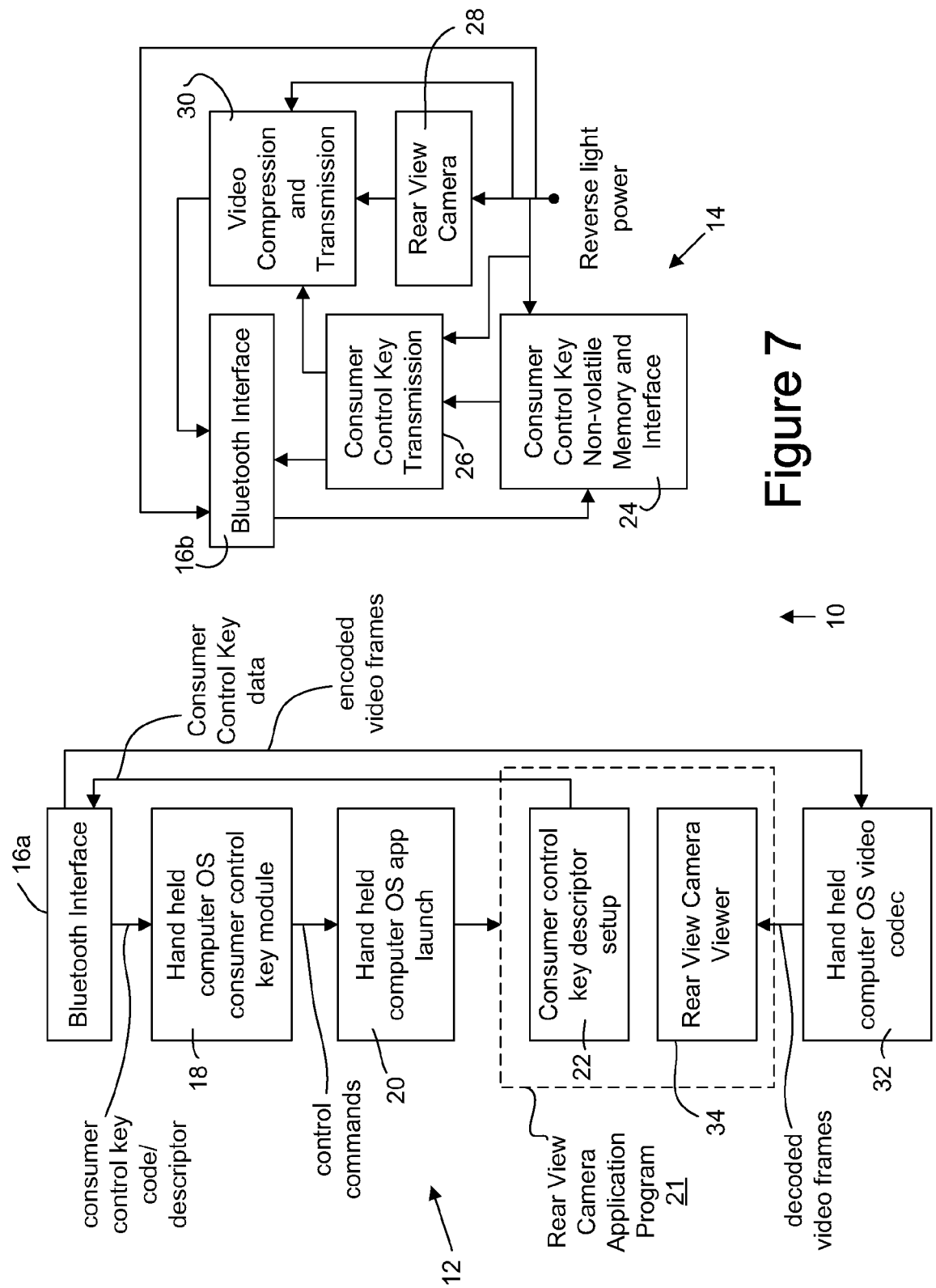
FIG. 7 is a block diagram illustrating a rear view camera system connected to 12V DC from the reverse lamp circuit incorporating the use of Bluetooth keyboard commands for causing the smartphone to present the rear view camera app to show video frames from the camera peripheral received over Bluetooth.

In some embodiments, the peripheral 14 is wired directly to back-up lamps, as described herein with respect to FIG. 7.

The codec 85 is a video codec as is known in the art for encoding a stream of images received from said rear view camera 28. The codec 85 may also compress the image data to reduce transmission bandwidth. In some embodiments, the codec 85 may be connected to the controller 86, where the controller 86 may vary the compression rate of the image data, via the codec 85, as a function of available bandwidth of the wireless channel established between the Bluetooth transceiver 16b and Bluetooth interface 16a, as explained herein. In some embodiments, the codec 85 may be part of the rear view camera 28. In other embodiments, the codec 85 may be separate from the rear view camera 28.

The battery 75 may be that as is known in the art. The battery 75 may be rechargeable.

The Activation Unit+Peripheral Combination:

In some embodiments, the activation of the peripheral may be initiated by a signal received from an activation unit 15. In some embodiments, the activation unit 15 may be separate from the peripheral system. As described herein, the activation unit 15 may be, for example, a dongle with a button that may be pushed by the user to signal the activation of the peripheral 14. In other embodiments, the activation unit 15 may be a device that sends a signal when the gear stick is shifted to a certain position, or the back-up lights turn on, as further described herein.

Figure 2A:
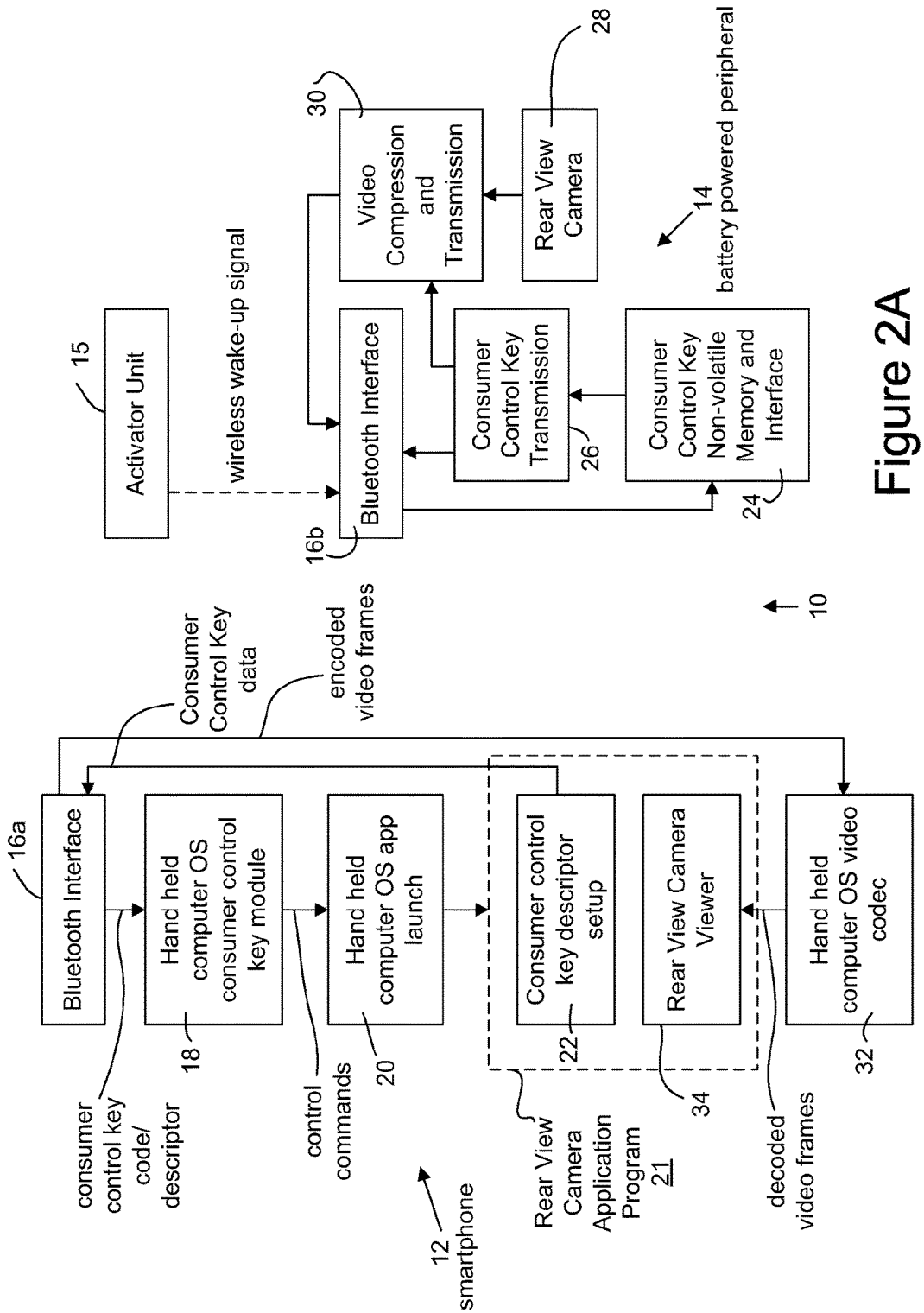
FIG. 2A is a block diagram illustrating a rear view camera system incorporating both an activation unit for waking up a battery powered camera peripheral and the use of Bluetooth keyboard commands for causing the smartphone to present the rear view camera app to show video frames from the camera peripheral received over Bluetooth.

Reference is now made to FIG. 2A, illustrating an exemplary peripheral camera system 10, with a peripheral 14 connected to an activation unit 15. The wake-up signal is sent by the activation unit 15 in the embodiment of FIG. 2A. Unit 15 can be a small battery-powered button supported on a key-chain, dashboard of a vehicle, visor, air vent, or any other suitable location that can allow the user to press a button (or otherwise issue a command) to cause the unit 15 to send a wireless signal to the interface 16b to cause the peripheral 14 to wake up. Unit 15 can be a stand-alone device or it can be integrated into a phone holder/case or tablet holder/case.

Figure 2B:
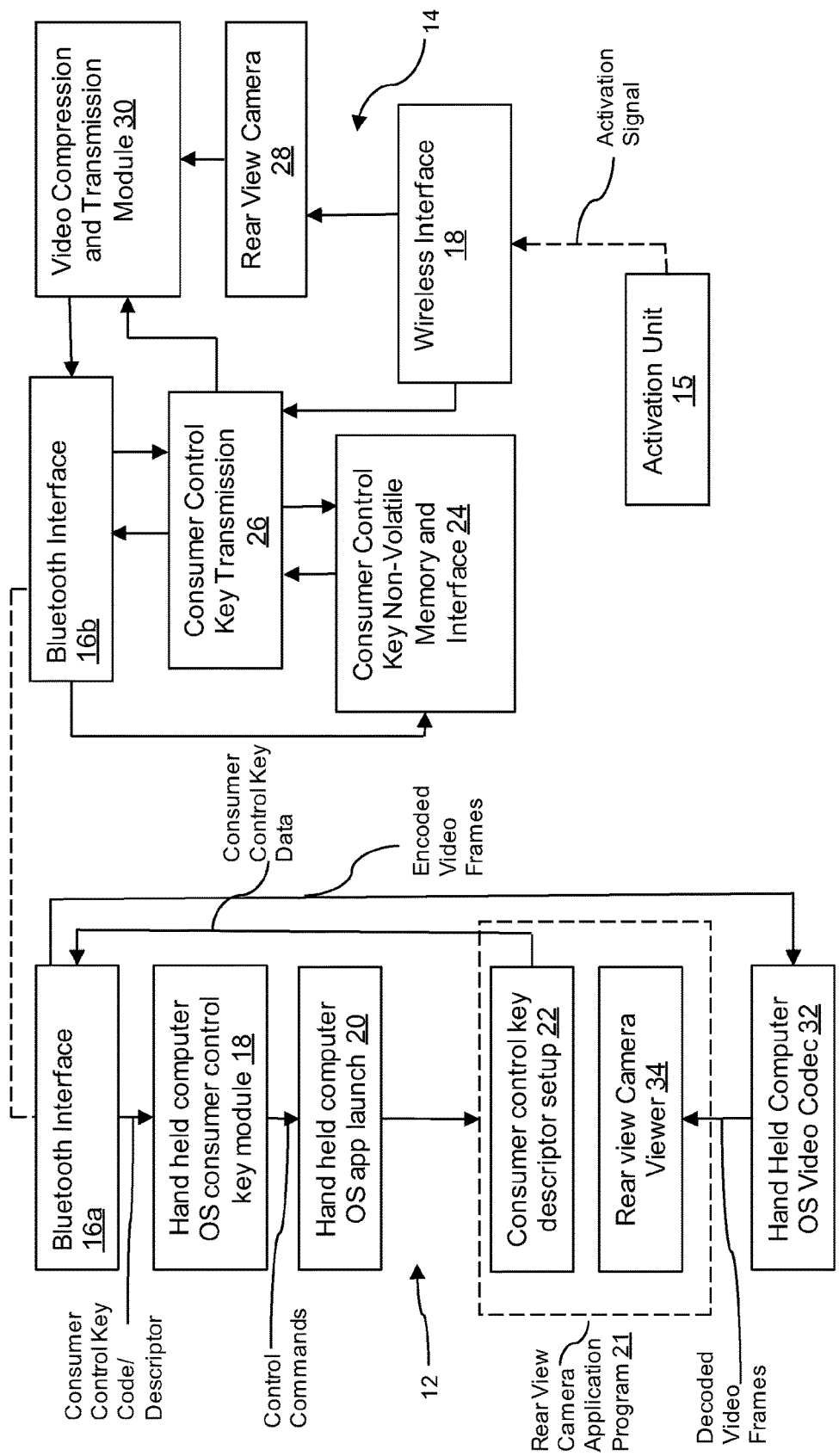
FIG. 2B is a block diagram illustrating an exemplary rear view camera system incorporating an activation unit sending a wireless activation signal to the peripheral over a first wireless connection, and the peripheral, once woken up, sending over a second wireless Bluetooth connection Bluetooth keyboard commands for causing the smartphone to present the rear view camera app to show video frames from the camera peripheral received over Bluetooth.

The activation unit 15 may establish a first wireless connection with the peripheral 14 that is not, in some examples, a Bluetooth connection. As shown in FIG. 2B, the activation unit 15 connects with a wireless interface 17 of the peripheral 14. The wireless interface 17 may be configured to establish a wireless connection with the activation unit 15, and receive a wireless activation signal from the activation unit 15. The peripheral 14 may establish a second distinct wireless connection with the smartphone 12 (e.g. a Bluetooth connection). The activation unit 15 may send the activation signal, for causing the peripheral 14 to turn on, to the wireless interface 17 across the wireless connection. As shown in FIG. 2B, the Bluetooth interface 16b establishes a Bluetooth connection with the Bluetooth interface 16a of the smartphone 12. This Bluetooth connection may be used to transmit the sequence of keyboard commands to the smartphone 12, or the stream of images from the rear view camera 28 to be displayed on the smartphone 12. In other embodiments, the activation unit 15 may establish a first wireless connection with the smartphone 12, and a second wireless connection with the peripheral 14.

Figure 2C:
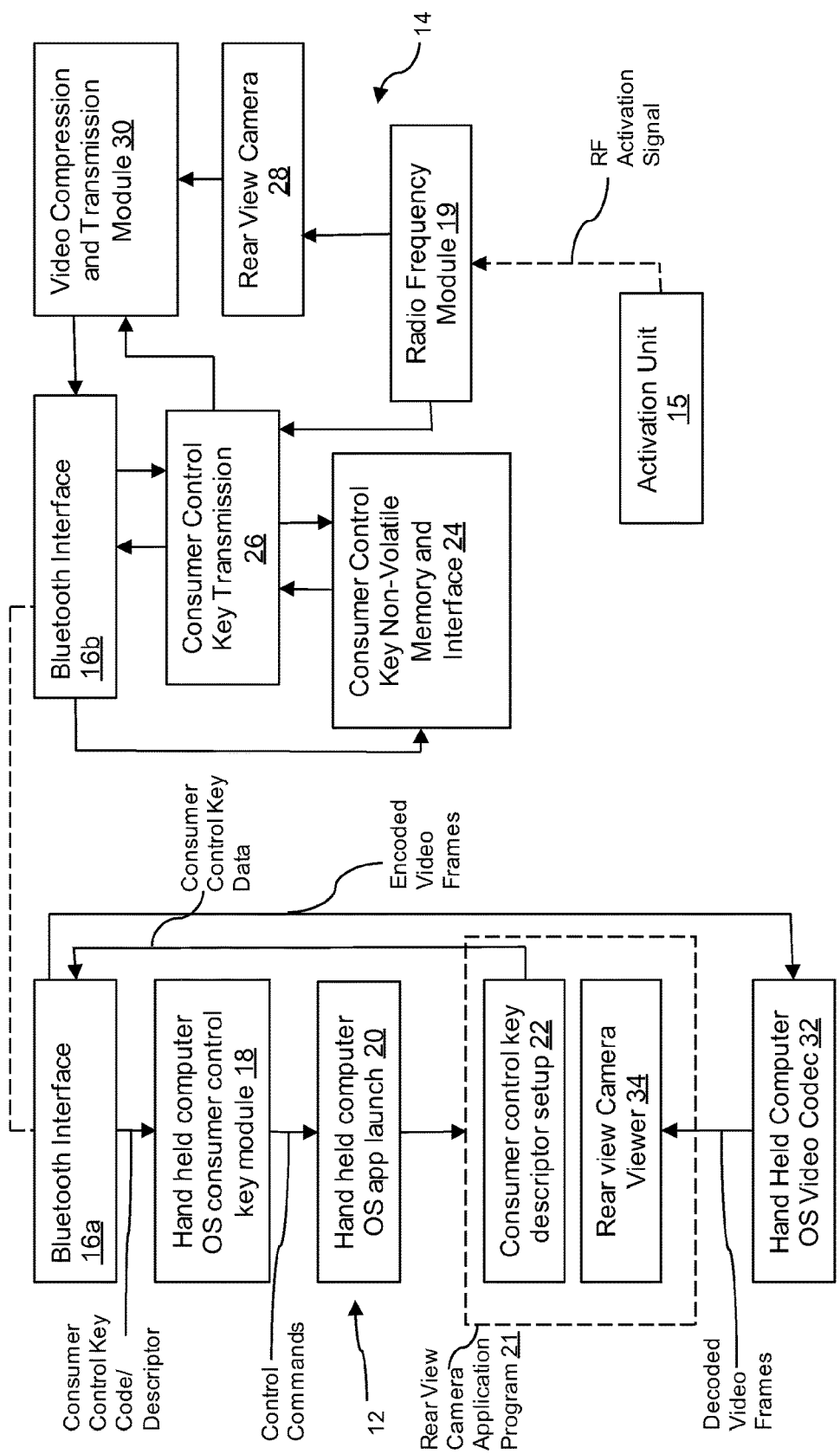
FIG. 2C is a block diagram illustrating an exemplary rear view camera system incorporating an activation unit sending an RF signal as an activation signal to the peripheral, and the peripheral, once woken up, sending over a second wireless Bluetooth connection Bluetooth keyboard commands for causing the smartphone to present the rear view camera app to show video frames from the camera peripheral received over Bluetooth.

In some examples, as shown in FIG. 2C, the activation unit 15 may communicate via radio frequency signals with the peripheral 14 (e.g. over a 915 MHz transmission channel), where the activation signal may be a radio signal. The peripheral 14 may have a RF module 18 (having, e.g. a RF module or RF transceiver chip as is known in the art) and the activation unit 15 may also have a RF module as is known in the art communicating with RF module 18 of the peripheral 14.

In the embodiment of FIG. 2A, the peripheral, once woken up, sends Bluetooth keyboard commands to the smartphone 12 to cause the latter to unlock (in the case that it was locked) and to run an app 21 associated with the rear view camera, including a viewer 34. The peripheral 14 has a program module 26 that causes the transmission of wireless keyboard commands previously stored in memory 26 to the Bluetooth interface 16a of the phone 12. Once these commands are sent, module 26 causes another module 30 of the peripheral 14 to encode the video images from camera 28 for transmission to the phone 12. The video encoding module 30 can comprise a hardware chip or software within the microcontroller or computer system.

In the case that the peripheral 14 transmits the keyboard commands to the smartphone 12, an HID keyboard is started using a classic Bluetooth connection. Module 26 then sends a sequence of keyboard commands stored in memory 24. In the case of an iPhone, this can comprise the following steps:
- send a first keystroke to light up the smartphone;
- send HID keyboard command for unlock swipe
- send passcode 4 digits or long passcode with ENTER
- in some examples, the Bluetooth keyboard can be stopped so as to be able to use an assistive touch command
- turn on the camera 28 in the peripheral 14
- send iOS launch command to launch app 21
- in some examples, start iOS assistive touch, start HID point device (Mouse service) and move mouse pointer to the "OK" confirm position and press to actually start camera APP; in other examples, launch the Spotlight Search app, enter the keyboard commands corresponding to the name of the image viewing application program, and launch the image viewing application program.

Once the app is fully launched, the video streaming starts. In some examples, disable assistive touch if it was activated to launch the viewing app.

An example of a command that simulates a press on touch screen can be as follows:

```
Enable assistive touch
/* HID map descriptor */
const unsigned char startHidMouseMessage[ ] =
{
    /* param 1 HIDComponentIdentifier*/
    0x00,0x06,  /* length */
    0x00,0x00, /* ID */
    0x00,0x00,
    /* param 2 vendorIdentifer */
    0x00,0x06,  /* length */
    0x00,0x01, /* ID */
    0x04,0x61,
    /* param 3 productIdentifier */
    0x00,0x06,  /* length */
    0x00,0x02, /* ID */
    0x00,0x00,
    /* param 4 HID report descriptor */
    0x00,0x36,  /* length */
    0x00,0x04, /* ID */
    0x05 ,0x01,
    0x09 ,0x02,
    0xa1 ,0x01,
    0x09 ,0x01,
    0xa1 ,0x00,
    0x05 ,0x09,
    0x19 ,0x01,
    0x29 ,0x03,
    0x15 ,0x00,
    0x25 ,0x01,
    0x95 ,0x03,
    0x75 ,0x01,
    0x81 ,0x02,
    0x95 ,0x01,
    0x75 ,0x05,
    0x81 ,0x01,
    0x05 ,0x01,
    0x09 ,0x30,
    0x09 ,0x31,
    0x15 ,0x81,
    0x25 ,0x7f,
    0x75 ,0x08,
    0x95 ,0x02,
    0x81 ,0x06,
    0xc0 ,
    0xc0
};
ISPP_Send_Control_Message(BluetoothStackID,
SerialPortID,0x5400,0,NULL);
//start assistivetouch
ISPP_Send_Control_Message(BluetoothStackID,
SerialPortID,0x6800,sizeof(startHidMouseMessage),(unsigned char *)startHidMouseMessage);
To simulate the screen press:
unsigned char mouseCmd[ ] =
{
    /* param 1 HIDComponentIdentifier*/
    0x00,0x06,  /* length */
    0x00,0x00, /* ID */
    0x00,0x00,
    /* param 2 vendorIdentifer */
    0x00,0x07,  /* length */
    0x00,0x01, /* ID */
    0x01,0x00,0x00
};
ISPP_Send_Control_Message(BluetoothStackID,
SerialPortID,0x6802,sizeof(mouseCmd),mouseCmd);
```

The memory 24 may store one sequence of keyboard commands associated with one task, or multiple sequences of keyboard commands, each associated to at least one task, such as, unlocking the smartphone 12, searching for the application program 21, running the application program 21.

In other examples, the keyboard commands do not need to include those for unlocking the smartphone 12. For instance, the sequence of keyboard commands may be limited to those necessary to run the application program 21. Once the smartphone 12 receives the sequence of keyboard commands, the sequence may be processed by the OS of the smartphone 12 to cause the application program 21 to run and to present a notification window appearing on the screen of the smartphone 12 when the smartphone 12 is locked. For example, in the case of an iOS device, such as the iPhone 6, the user may swipe to the side the notification box corresponding to app 21 and, by using the iOS device's fingerprint security protocol, unlock the device by presenting the user's fingerprint (or the user may type in the user's unlock code). Once the smartphone 12 unlocked, app 21 begins to run and the display of the smartphone 12 begins to show the images received from the peripheral 14.

It will be understood that the sequence of keyboard commands used to cause the smartphone to perform certain tasks, such as its unlocking or running a designated application, depends on the platform of the smartphone. The sequence of keyboard commands also depends upon the task to be carried out. Therefore, a skilled person will readily understand that a desired sequence of keyboard commands for a specific platform may be determined using basic trial and observation, where the effect of receiving a specific sequence of keyboard commands by the smartphone is monitored for the desired action.

While the video transmission in FIG. 2A is done using the same Bluetooth interface 16b as is used for the wireless keyboard interface, a separate wireless transmission link could be used. For example, it is possible to use an IEEE 802.11 (i.e. WiFi) link or a wireless USB or WUSB link to transmit the video data. This would require connecting the smartphone 12 to a corresponding WiFi link bridge of the peripheral 14. Keyboard commands from peripheral 14 can be used to cause the smartphone to establish a WiFi connection to a WiFi module of the peripheral 14. This option can provide greater bandwidth than Bluetooth, however, causing the smartphone 12 to make the new WiFi connection can cause the smartphone 12 to drop an existing WiFi connection and can require a few seconds to establish. Applicant has found the use of WiFi to be acceptable in some circumstances, however, Bluetooth communication has been found to be faster to start and to have sufficient bandwidth for the rear view camera application.

Figure 2D:
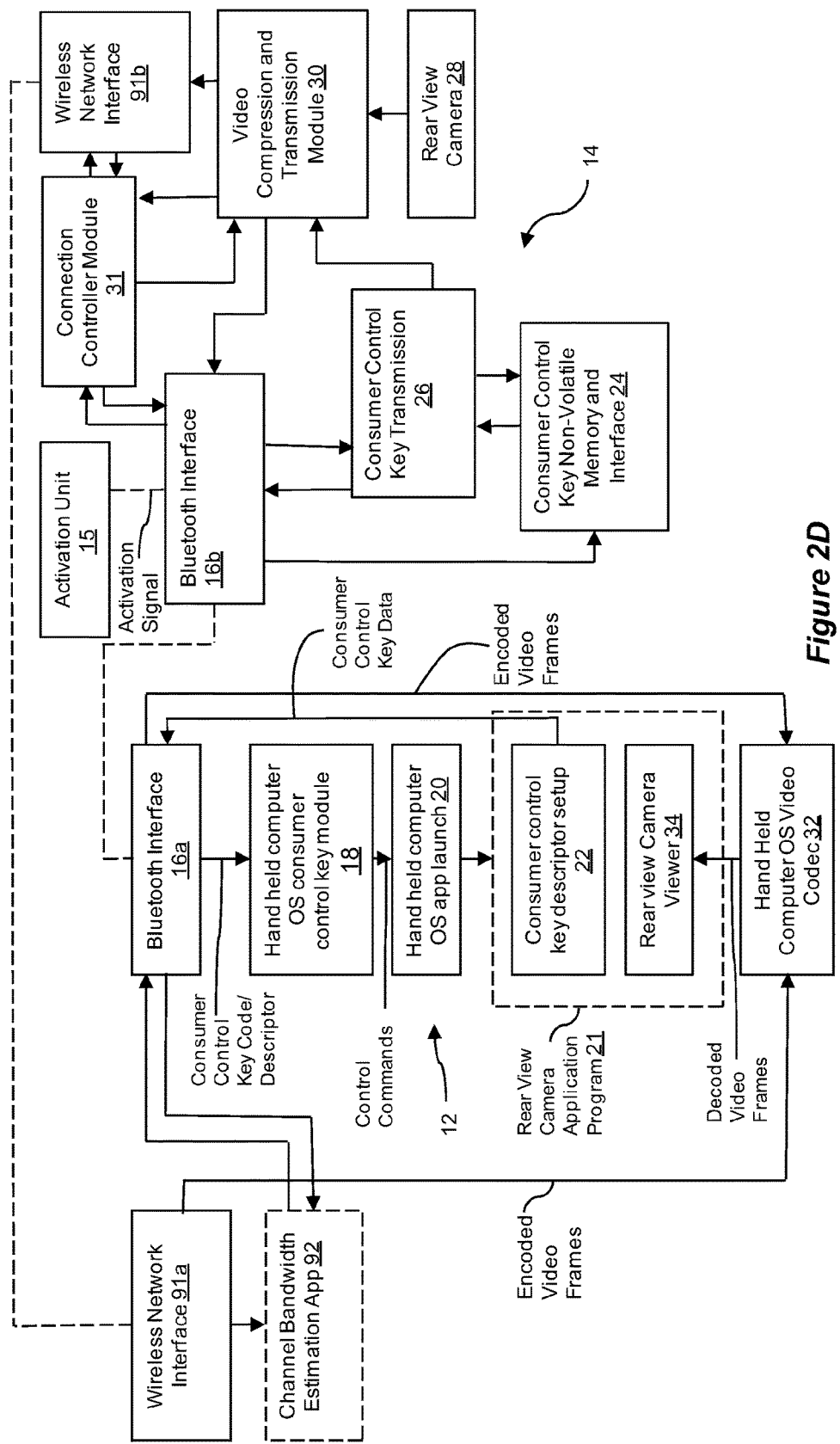
FIG. 2D is a block diagram illustrating an exemplary rear view camera system where the peripheral has a connection controller module and the smartphone shares both a Bluetooth connection and WiFi connection with the peripheral.

In some embodiments, as shown in FIG. 2D, the peripheral 14 may share a WiFi connection with the smartphone 12 in addition to the Bluetooth connection established between the smartphone 12 and the peripheral 14. The Bluetooth connection is established between the Bluetooth interface 16a of the smartphone 12 and the Bluetooth interface 16b of the peripheral 14. The smartphone 12 and the peripheral 14 share a common WiFi connection, where both wireless network interface 91a of the smartphone and the wireless network interface 91b of the peripheral 14 connect to a common WiFi connection (e.g. the building's WiFi connection when the vehicle is in or in proximity of the building; a wireless network connection; or a wireless wide area network).

In some embodiments, the smartphone 12 has a channel bandwidth estimation app 92 configured to estimate the connectivity and/or the available bandwidth over the WiFi connection between the smartphone 12 and the peripheral 14. In some examples, channel bandwidth estimation app 92 may also estimate the available bandwidth over the Bluetooth interface 16a for sending signals to the peripheral 14 to adjust, for instance the FPS or compression ratio of the stream of image data. The channel bandwidth estimation app 92 estimates the available bandwidth over the WiFi connection by communicating with the wireless network interface 91a. The channel bandwidth estimation app 92 detects if the bandwidth of the WiFi connection drops under a desired level, and/or if the WiFi connection is lost altogether. If so, the channel bandwidth estimation app 92 may send, via the Bluetooth interface 16a (or, if the WiFi connection is of limited bandwidth, but still active, via the wireless network interface 91a), a signal to the Bluetooth interface 16b (or wireless network interface 91b). This signal is relayed to the connection controller module 31. The connection controller module 31 (e.g. module 31 may be software stored in the memory of peripheral 14, carried out by a processor of the peripheral 14) receives the signal and instructs the video compression and transmission module 30 to switch the sending of the stream of image data from the wireless network interface 91b (over WiFi) to the Bluetooth Interface 16b (over Bluetooth).

Similarly, when the WiFi connection is re-established or when the available bandwidth of the WiFi connection increases, as determined by the channel bandwidth estimation app 92, the channel bandwidth estimation app 92 may send a signal to the peripheral 14 to switch the streaming of image data to the WiFi connection. The connection controller module 31 receives this signal and instructs the video compression and transmission module 30 to transmit the stream of image data to the wireless network interface 91b (to send via the WiFi connection), and not the Bluetooth interface 16b.

In some embodiments, the smartphone 12 may not have a channel bandwidth estimation app 92. In these embodiments, the analysis of WiFi connectivity and available bandwidth may be done by the connection controller module 31. The connection controller module 31 may then signal the video compression and transmission module 30 to switch between transmitting the stream of image data to the Bluetooth interface 16b or the wireless network interface 91b depending upon the WiFi connectivity and/or the available bandwidth over the WiFi connection.

It will be understood that because the WiFi connection may provide greater bandwidth than the Bluetooth connection, a switch of the streaming of image data from the WiFi connection to the Bluetooth connection, such as when the WiFi connection is lost, may require adjusting the frame rate and/or the compression ratio of the stream of image data. For instance, the stream of image data may be at 30 FPS when streaming over the WiFi connection, but may drop to 16 FPS, including, in some cases, a change in the compression ratio of the stream of image data, when switched to the Bluetooth connection. In some examples, if the available bandwidth of the Bluetooth connection drops, the video compression and transmission module 30 (receiving instructions from the connection controller module 31) adjusts instead the compression ratio so that the frame rate does not drop below a certain level which would lead to a choppy video (i.e. the video is no longer fluid), The varying of the compression ratio allows to compensate for the reduced available bandwidth while maintaining a fluid video (e.g. over 16 FPS).

Furthermore, the bandwidth available over the wireless communications link can be assessed and the video transmission rate can be adjusted according to the assessed bandwidth by setting a compression ratio in module 30, for example a TW9900 chip with an OV780 chip that can provide a variable compression ratio. The available bandwidth can be assessed, for example, by sending a block of data from peripheral 14 to app 21 and measuring the time required for the block of data to be transmitted. The peripheral 14 can then adjust the compression and/or the frame rate accordingly. Applicant has found that the quality of viewing is greatly improved to use a frame rate and/or a compression rate that the channel can handle without dropping frames rather than using a lower compression rate or a frame rate that then involves some frame drops. For instance, when the peripheral 14 is used for assisting a driver with backing up the driver's vehicle, the video feed received by the driver is as close as possible to real-time (e.g. no buffering) for allowing the driver to promptly react as he or she is operating the vehicle as a function of the received image feed. If the driver receives an intermittent video as a result of dropped frames, due, for example, to limited available bandwidth, the driver may be missing important information, such as the presence on an obstacle behind the vehicle (e.g. a child) and may not have received the visual information in time to avoid the obstacle.

To ensure the Bluetooth streamed video's latency performance, the following can be performed. The Bluetooth radio's usage of the smartphone can be monitored in real-time. This can be done with the help of app 21 in communication with peripheral 14. It is determined if a phone call is in progress at device 12 and if the audio route is to Bluetooth hands-free. If Smartphone's 12 Bluetooth radio is in use, then the H264 video's compression ratio in module 30 is dynamically adjusted to reduce the bit rate of the video so that video's latency performance is assured. Then, app 21 monitors the video streaming bit rate in real-time, as smartphone 12 knows the video's source bit rate, if the streaming bit rate is lower than the source bit rate (consistently for a predefined period of time), the app 21 can decide that the lower streaming bit rate is due to interference of surrounding environment and increase the H264 video's compression ratio by sending a command to peripheral 14 to reduce video source bit rate in module 30.

It is also possible to cause the smartphone 12 to stop using the wireless channel for the telephone call audio by causing the smartphone to change the audio output of the smartphone from, for example, Bluetooth to the smartphone's own built-in speaker. The app 21 may or may not be able to issue such a command to the operating system of the smartphone 12, and in the case that it cannot, suitable wireless keyboard commands can be issued from module 26 to cause the audio streaming usage of the wireless channel to be stopped so that more bandwidth is available for the video data. When video transmission is over, the user can restore telephone call streaming over the wireless channel, or the app 21 or module 26 can perform the restoration.

Figures 4, 5:
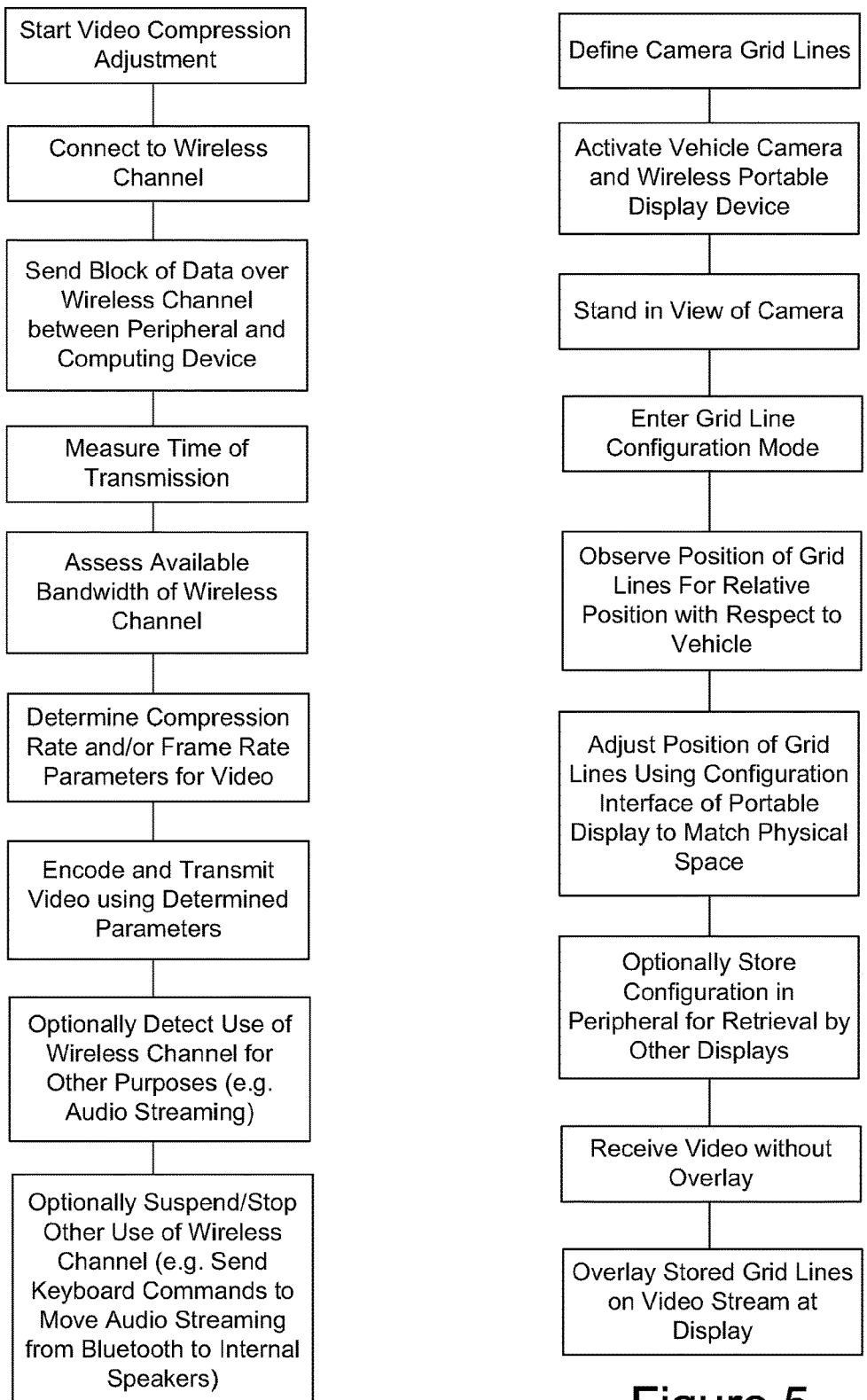
FIG. 4 is a flow diagram showing the steps involved in one embodiment of adjusting a video compression rate after an assessment of the available bandwidth of a wireless channel used for the video transmission.
FIG. 5 is a flow diagram showing the steps involved in an embodiment of setting vehicle camera grid lines.

The steps involved in adjusting the frame rate or compression rate in the video encoding are illustrated in FIG. 4.

In the embodiment of FIG. 2A, the smartphone 12 has a video codec 32 that is shown as part of the operating system of the hand held computer or smartphone. Alternatively, the video codec 32 could be provided in software within the app 21. Decoded video frames from module 32 are then displayed on the display viewer 34. While it is preferable to transmit encoded and compressed video, uncompressed images can also be transmitted, possibly at a lower resolution or frame rate.

When a driver is finished using the peripheral 14, the user can switch apps using the interface controls of the smartphone 12 or alternatively the unit 15 can be used to signal closing or stopping of the peripheral 14. Unit 15 can make use of a separate key or an interpretation of a same key (subsequent press, held-down press, or a double tap) to issue shutdown commands to either the peripheral 14 or the smartphone 12, or to both. The shutdown command to the phone 12 can involve Bluetooth keyboard commands to be sent directly or via peripheral 14 to interface 16a to cause the peripheral 14 app 21 to close and then, preferably as configured by the user, the smartphone 12 can turn its screen off, lock, go to a home screen, go to a GPS navigator app, etc. This can save the user from having to manipulate the smartphone 12, following a backing up action of the vehicle and normally an immediate action of continuing to drive forward.

Because the camera 28 can be an after-market device, the position of the camera, its tilt angle and the vehicle width are not known until installation. In some embodiments, rear view camera grid lines can be used to estimate the distance and the width of the vehicle when using the camera image for backing up. Such grid lines are known, and in the case of grid lines to guide backing up into a parking space, the lines appear as curved lines that should follow the image of the parking space's parallel lines with transverse curved lines showing distance from the vehicle bumper to the end of the space. Producing an overlay of grid lines using an analog video camera is complicated, and in some embodiments, grid line display is achieved in app 22 rather than in the peripheral 14. The app 22 can be provided with a settings mode that gives the user the ability to adjust the grid lines. Because the smartphone 12 is wirelessly receiving the images, the user can exit the vehicle and stand in the camera's field of view to be on the grid lines seen using app 22. FIG. 5 illustrates the step involved in configuring the grid lines. The user can then use the interface of the app to set the position of each of the side or width lines to take into consideration camera position (particularly when the license plate is to one side of the rear of the vehicle) and the vehicle width, and to set the position of the transverse distance line or lines. These calibration settings can be stored in the app 22 or they can be stored in the peripheral 14 so that they can be retrieved and used with the smartphone app 22 of other users.

FIG. 7 illustrates an embodiment similar to that of FIG. 2A in which activation of the peripheral comes from a different mechanism than the activation unit 15. In FIG. 7, the rear view camera peripheral 14 is turned on by being powered from the 12V DC power taken from the vehicle's reverse indicator lights. An installer finds the power cables connected to the back up or reverse indicator lamps, and splices in a power cable that feeds the peripheral 14. Since power is provided to the reverse indicator lamps by a switch associated with the gear shift mechanism, the peripheral is selectively powered only when the vehicle is in reverse gear.

When the peripheral 14 is battery-powered, installation in the case of a vehicle can be simplified because a power cable is not required to pass from an inside of the vehicle to an outside. However, on/off control of the peripheral 14 using a vehicle signal, such as the on/off state of the back-up indicator lights, is convenient because the driver does not need to engage a separate control for the camera. In an alternative embodiment, the activation unit 15 is installed in the vehicle to be controlled by a vehicle signal, such as the on/off state of the back-up indicator lights. For example, an activation unit can be installed in a compartment housing the rear brake/running/back-up indicator lights and powered by the turning on of the back-up lights. In this way, when the driver puts the vehicle into reverse, the activation unit 15 can cause the operation of the rear-view camera to start.

Figure 8:
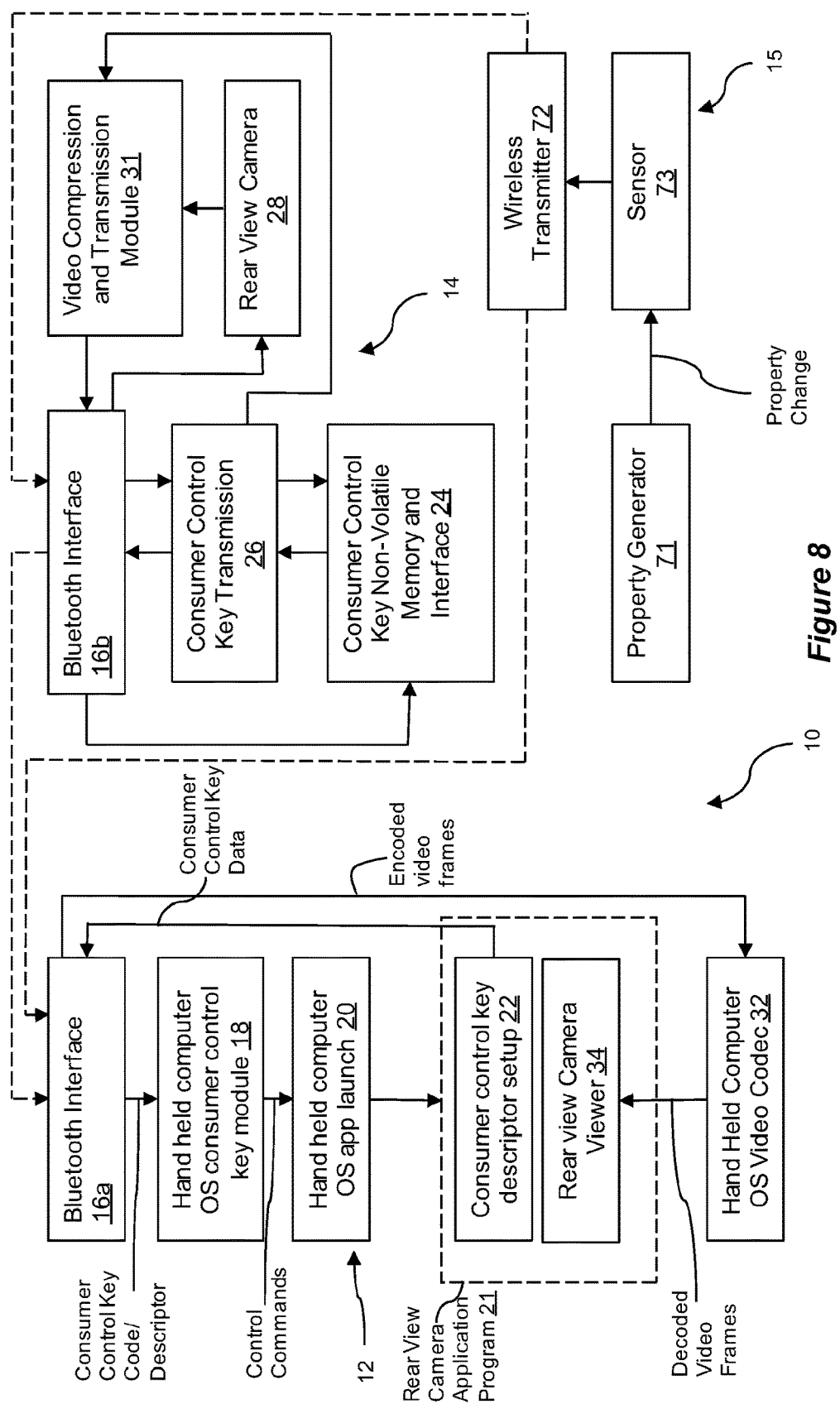
FIG. 8 is a block diagram illustrating a rear view camera system wirelessly connected with a gear shift signalling system incorporating the use of Bluetooth keyboard commands for causing the smartphone to present the rear view camera app to show video frames from the camera peripheral received over Bluetooth.

In some embodiments, as illustrated in FIG. 8, the activation of the peripheral 14 may be the result of a signal that it receives once a gear stick of the vehicle is placed in reverse. For example, the peripheral 14 may be activated by receiving a signal from an activation unit 15 acting as (or having) a gear shift signaling device. The activation unit 15 detects when the gear stick is shifted into a certain position, for instance, a reverse position (indicating that the driver intends to back up the vehicle), and sends a signal to the peripheral 14 that in turn communicates with the smartphone 12 to turn on the APP 21 responsible for showing the images streamed from the rear view camera 28.

The activation unit 15 of FIG. 8 has a property generator 71 for generating a change in a given property (e.g. a magnetic field, change in light intensity), a sensor 73 adapted to pick up on a specific property change, a wireless transmitter 72 responsive to the sensor 73 picking up on a given property change, and an attachment device for joining at least a portion of the activation unit 15 to the shaft of the gear stick (or another portion of the gear stick).

The wireless transmitter 72 may be one for establishing a bandwidth limited connection, e.g. a wireless Bluetooth transmitter. The wireless transmitter 72 may transmit, via a Bluetooth connection, an activation signal to the peripheral 14 via the Bluetooth interface 16*b* (or to its camera 28) once the sensor picks up on a desired change in property. The wireless transmitter 72 is connected to the sensor 73, receiving a signal from the sensor 73 once the sensor 73 picks up on a specific property change. In some examples, the wireless transmitter 72 is a radio frequency transmitter (e.g. a RF module) configured to send a wireless RF activation signal to the peripheral 14 once a gear shift to the desired position is detected.

The attachment device is attached to at least a portion of the activation unit 15 and is adapted to attach to the gear stick. For instance, the attachment device may be an adjustable clamp on ring (e.g. a clamp ring), wrapping around the shaft of the gear stick, to which at least a part of the activation unit 15 is attached.

The property generator 71 may be composed of two parts. A first part of the property generator is located in the car next to the position of the gear stick when the gear stick is placed in reverse. For instance, the first part of the property generator 71 may be fixed on the inner surface of the box that at least partly encases the gear stick, the first part of the property generator 71 located at the position where the gear stick is located when moved to the reverse position. A second part of the property generator 71 may be joined to the gear stick. When the gear stick shifts to the reverse position, the first and second parts of the property generator 71 align and/or are placed in proximity so as to create a property change. For instance, the first part of the property generator 71 may be a magnetic strip, and the second part of the property generator 71 may be a magnet located on the activation unit 15 joined to the gear stick. Therefore, the magnetic strip is fixed, but the magnet joined to the gear stick shifts with the gear stick. The magnetic strip and the magnet on the gear stick are positioned in such a way that when the gear stick shifts into reverse, the magnet attached to the gear stick moves next to the magnetic strip, generating a magnetic field change (i.e. a property change). In other examples, the first part of the property generator 71 may be a reflective strip placed next to where the gear stick would be in the reverse position, and the second part of the property generator 71 may be a light source (or light emitter) connected to the gear stick. The light emitted by the light source is reflected by the reflective strip when the gear stick is positioned in reverse. The above are but examples of a property generator 71 and the skilled person will readily recognize that other means for generating a property change when the gear is shifted to a desired position may be used.

The sensor 73 is attached to the gear stick via the attachment device and detects a change in a given property, the change in property created by the property generator 71 when its first and second parts are placed in proximity as a result of the gear stick moving into reverse. For instance, the sensor 73 may be one for detecting the creation or change in a magnetic field, such as by detecting the variation in an output voltage (e.g. a Hall effect sensor). In this example, where the first part of the property generator 71 is a magnetic strip, and the second part of the property generator 71 is a magnet, the magnetic field sensor 73 detects the magnetic field created when the magnet, attached to the gear stick is moved next to magnetic strip. In another example, the sensor 73 is a light sensor (e.g. a photo sensor), and the first part of the property generator 71 is a reflective strip and the second part of the property generator 71 is a light source attached to the gear stick (via the attachment device). When the light source is moved with the gear stick in proximity with the reflective surface (the gear stick being in reverse), the light emitted by the light source is reflected off the reflective strip and detected by the light sensor 73. When the gear stick is in another position than in reverse, the light is not reflected off the reflective strip and the light sensor 73 does not detect light (the property change). Once the sensor 73 picks up on the property change, indicative of the gear stick being put into reverse, the sensor 73 sends a signal to (or prompts) the wireless transmitter 72. In response, the wireless transmitter 72 sends an activation signal via the wireless connection to the peripheral 14, the peripheral 14 turning on its rear view camera 28 once it receives the wireless activation signal from the wireless transmitter 72. In some examples, the wireless transmitter 72 may send a wireless signal to the smartphone 12 to turn on and open the camera APP 21 (e.g. keyboard commands to turn on the smartphone and run the camera APP 21). In other examples, the smartphone 12 and the camera APP 21 are turned on by the peripheral 14, receiving the keyboard commands or activation signal from the peripheral 14, once the peripheral 14 has received the activation signal from the activation unit 15.

It will be appreciated that the activation unit 15 may send out a signal to cause the peripheral 14 and/or smartphone 12 to turn on when the gear stick is shifted into another position than reverse (e.g. in "Drive"), such as when the peripheral's camera is to turn on when the vehicle is, for instance, put into "Drive" (the camera located as the front of the vehicle). Necessary adjustments are made to the positioning of the components of the activation unit 15 as a result, such as the location of the first part of the property generator 71 (e.g. placing the first part of the property generator 71 next to where the gear stick is positioned when in "Drive").

The steps for the embodiment of the rear view camera video start sequence can be as follows. The user can approach the vehicle where peripheral 14 is paired with his or her phone 12. The peripheral 14 detects phone 12, making a classic Bluetooth connection, and MFi authentication is done. The phone 12 and peripheral 14 are now connected. The Bluetooth connection between them is maintained with minimum power consumption by maintaining only the Bluetooth component powered while the camera and video compression processor are off. The power requirements for maintaining this Bluetooth connection are so low that conventional batteries can power the unit 14 to remain wirelessly connected for years at a time. Pressing a button on activation unit 15 can cause it to turn on and connect to the peripheral 14. Peripheral 14 responds to the signal from unit 15 to cause the camera 28 and video transmission 30 of peripheral 14 to turn on.

In some embodiments, peripheral 14 and activation unit 15 are paired at the factory. Interface 16b can be configured to be always advertising. Activation unit 15 is normally off. When a button is pushed on unit 15, power is supplied from its battery and the Bluetooth connection is made. In peripheral 14, when the interface 16b is connected to the activation unit 15, interface 16b turns on the remainder of the components in peripheral 14. Thus, codec 30 and camera 28 turn on. When the vehicle driver wants to use the rear view camera, the video button on unit 15 is pressed. Unit 15 can be powered by a small button battery, and so can be powered on by pressing its button. In some embodiments, this is the only button. The Bluetooth module 16b of the rear view camera peripheral unit 14 detects the button pressed. The module 16b now powers up the peripheral components. In the case of a microprocessor that can be woken up by an interrupt, module 16b issues the interrupt. As a result, the camera 28 is powered and video compression and transmission 30 are ready to be started. Video compression can be handled in the microprocessor, or it can be handled by a separate chip, for example a TW9900 chip with an OV780 chip.

The peripheral 14, particularly in the case of a vehicle rear view camera accessory, can be vulnerable to theft. To reduce the ability for the peripheral 14 to be used by a thief, a master phone 12 is designated. The peripheral 14 can thereafter only be used by a smartphone 12 that is given permission by the master phone 12. This can be done, in the example of an iPhone, by turning on Bluetooth in the setting of the iPhone 12. In the example an Android phone, the app 21 can be started. The peripheral device 14 can be turned on using a switch on the peripheral 14 or by using unit 15. On the iPhone, a Bluetooth pairing request will appear, and the user can complete the pair request. Using an Android device, the pairing can be completed by the app 21. On the iPhone, the app 21 can then be started. Video can then appear on screen. In the app 21, the user provides the input required for the commands to be stored in memory 24. For example, the user provides the unlock code, and this code is send to peripheral 14 to be stored in memory 24. The peripheral 14 is configured to recognize the Bluetooth ID (an equivalent of a MAC address unique to the device) of the phone being first paired and to refuse pairing with another smartphone 12 unless given permission from the first paired smartphone 12. Peripheral 14 stored the Bluetooth ID of the first or master smartphone 12 in non-volatile memory, along with the ID's of all authorized smartphones 12. If the master smartphone is lost, a number of factory set backup single-use master codes are also stored. The owner of the peripheral 14 can contact the manufacturer with the peripheral's serial number to retrieve a backup code that, when sent to the peripheral from app 21, will cause the peripheral 14 to replace the previous master smartphone Bluetooth ID with the new one. The manufacturer can identify the registered owner of the peripheral by the serial number and/or the owner's identification. Once a one-time back up code is used, the used status is recorded in the nonvolatile memory and is no longer useable.

Stopping the Peripheral:

Stopping of the camera and app can be done either in response to a timer or in response to a subsequent user input, either from the unit 15 or on the smartphone app 21. For example, the video can stop after a short period, such as 20 seconds, using a timer, or the video can be stopped when the button of unit 15 is pressed and video is being streamed. Peripheral 14 would shut down all components except for the module 16b, so that the Bluetooth connection is maintained between the peripheral and the activation unit. The peripheral can also send a command to the app 21 that streaming will stop, so that the app can manage the end of streaming without an error. Alternatively, the app 21 can be used to send a stop signal to the peripheral 14.

In some embodiments, app 21 may also be communicating with the GPS application of the smartphone 12. App 21 may use the GPS data of the GPS application to detect the speed of the vehicle. Once the speed of the vehicle is detected by the GPS application as being, for instance, over a certain amount (i.e. indicating that the vehicle may no longer backing up), the GPS data, analyzed by app 21, may cause app 21 to shut off, and may cause the smartphone 12 to send a wireless signal to the peripheral 14 to stop streaming.

For security reasons, the HID keyboard interface is started again at the peripheral 14, and a lock key command is sent to lock the phone 12. Then the HID keyboard interface is stopped and the peripheral 14 sleeps with the exception of its Bluetooth interface 16b.

Figure 6:
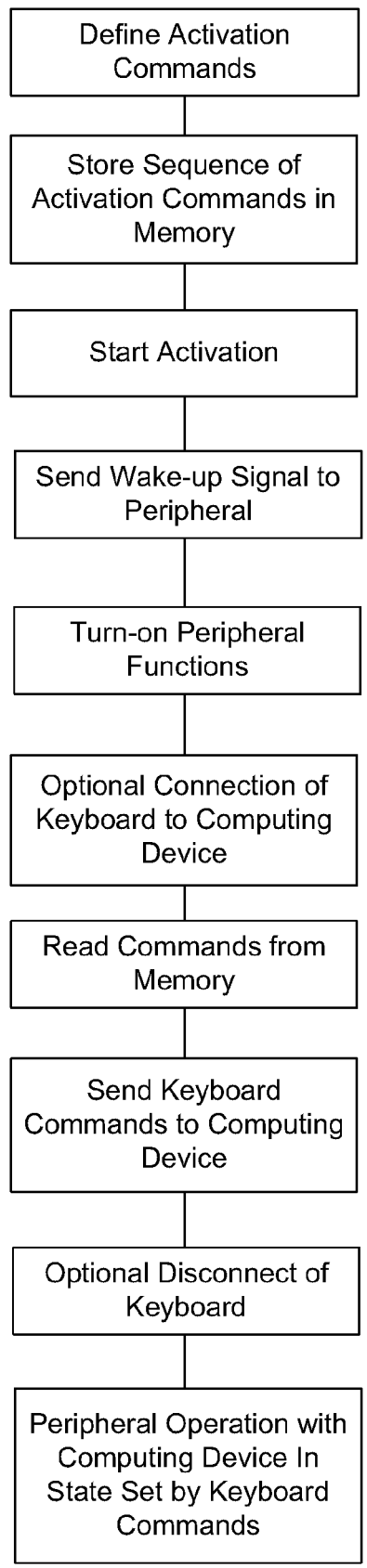
FIG. 6 is a flow diagram showing the steps involved in controlling a computing device using a stored sequence of keyboard commands according to one embodiment.

The steps involved in activating the peripheral 14 and the smartphone 12 to operate are illustrated in FIG. 6.

In the embodiment of FIG. 7 where the sleep mode is not managed by interface 16b, the peripheral 14 can follow the above sequence for sending the commands to wake up the phone 12 and to cause the app 21 to open up, however, the commands and/or signals related to waking up and sleeping the peripheral 14 are not required.

The embodiment of FIG. 7 has the advantage over prior art systems that the smartphone 12 can be off and locked, and then the peripheral 14 can cause the smartphone 12 to be unlocked and to open up the app 21 associated with the rear view camera peripheral 14 without the user needing to manipulate the phone 12.

Figure 9:
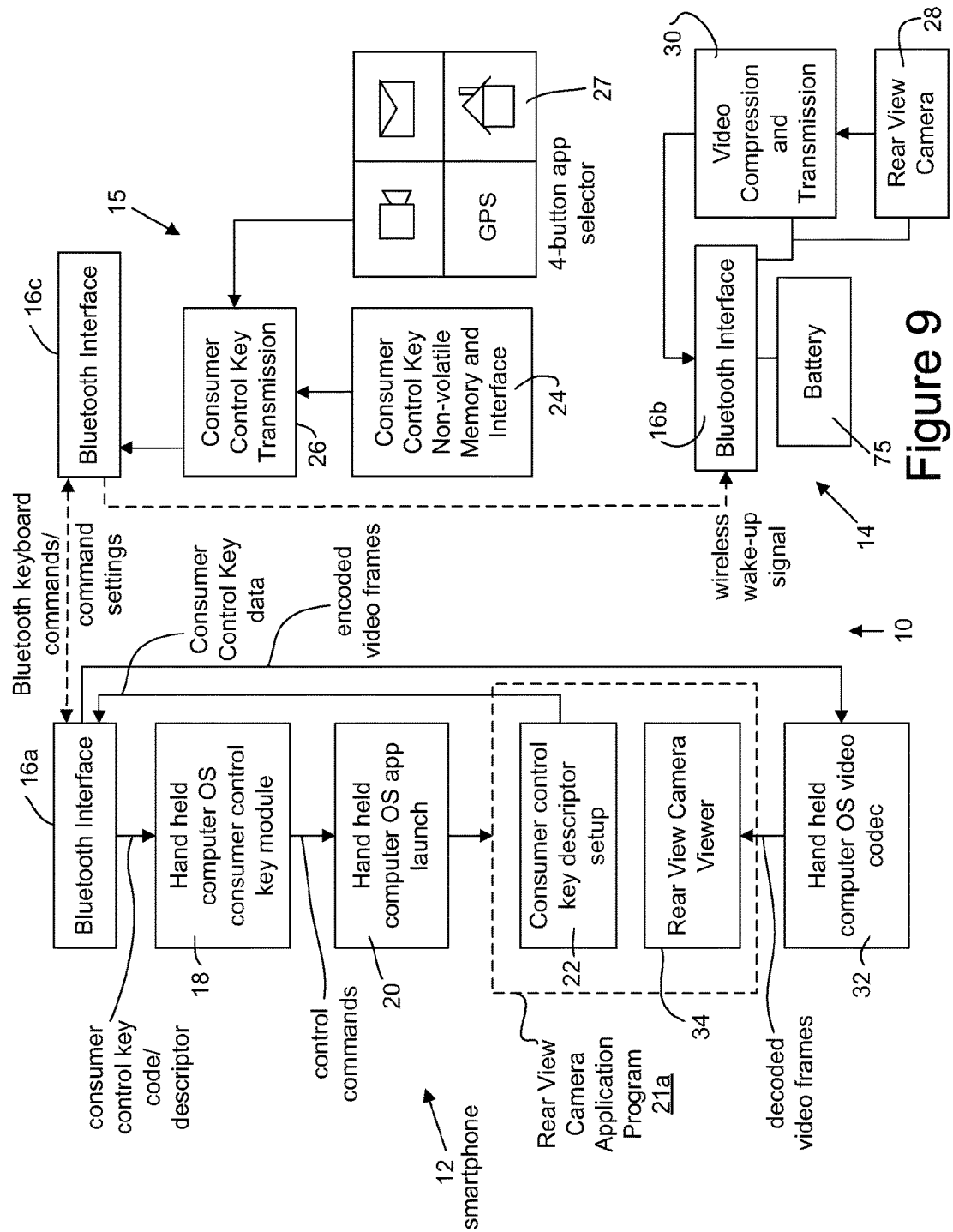
FIG. 9 is a block diagram illustrating a rear view camera peripheral activated by a battery-powered, dashboard mounted activation unit having multiple app launching buttons.

In FIG. 9, the peripheral 14 can be woken up using the activation unit 15 directly using Bluetooth communication from interface 16c, or it can be woken up by the app 21a (through interface 16a) that is called up by activation unit 15 in the manner described above. As illustrated, the keypad 27 can have four buttons (any number can be provided as desired), with buttons labeled for specific apps, such as the rear view camera, GPS navigator app, mail app, a "phone home" button that launches the telephone to call a specific number, etc. Configuration of the commands can be done in module 22 whether in a stand-alone app or as part of the peripheral app 21a.

Figure 10:
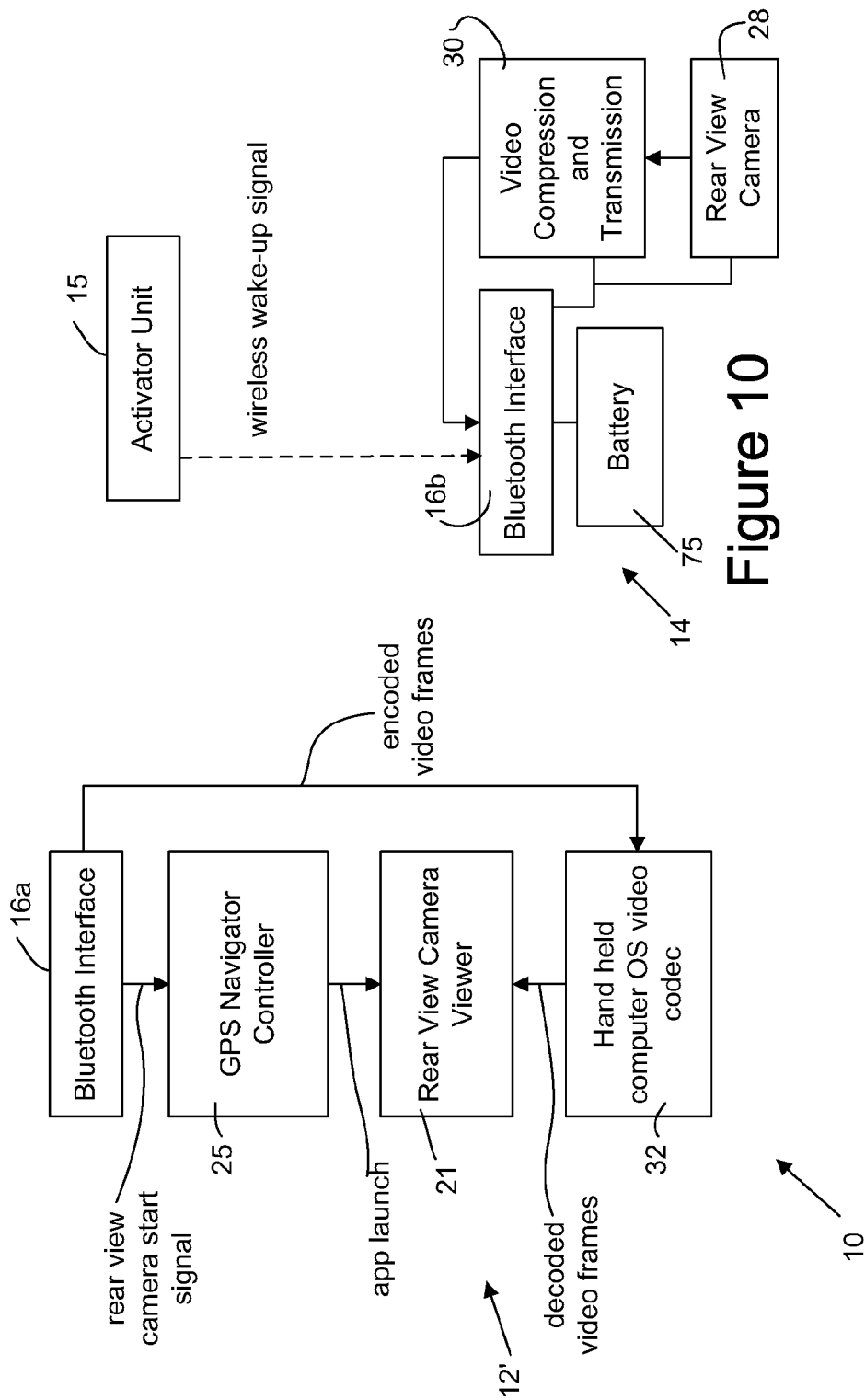
FIG. 10 is a block diagram illustrating a rear view camera peripheral activated by a battery-powered, dashboard mounted activation unit that works with a GPS navigator unit that includes a camera viewer program module.

In the embodiment of FIG. 10, a battery-powered rear view camera peripheral 14 with battery 75 is coupled with an activation unit 15, while the peripheral 14 is coupled with a dedicated GPS navigator unit associated with the vehicle. As in embodiments above, the activation unit 15 can be coupled with the peripheral's Bluetooth interface 16b to cause it to wake up (as illustrated) (or, in some examples, the activation unit 15 may use its RF transmitter to send a radio frequency activation signal to the RF module of the peripheral 14), or it can be coupled with the interface 16a of the display unit 12' which in turn will send the peripheral 14 a wake up command over interface 16b. When a GPS unit is equipped with Bluetooth communications abilities 16a, this embodiment requires additional software to provide the codec 32, the view display and the mode switching between regular navigation mode and camera display mode, but no additional hardware to provide the rear view camera capability. The activation unit 15 of FIG. 10 may store a sequence of keyboard commands in memory 24, where consumer control key transmission module 26 retrieves the sequence of keyboard commands and sends it to display unit 12 (when, e.g., display unit 12 is a iOS based smartphone). The sequence of keyboard commands may cause the display unit 12 to unlock and run the viewing application program 21*a*.

Likewise, the embodiment of FIG. 10 could exclude the activator 15 as a separate component, and allow controller 25 through user input to cause interface 16*a* to send a wake-up signal to interface 16*b* of the peripheral 14.

Figure 11:
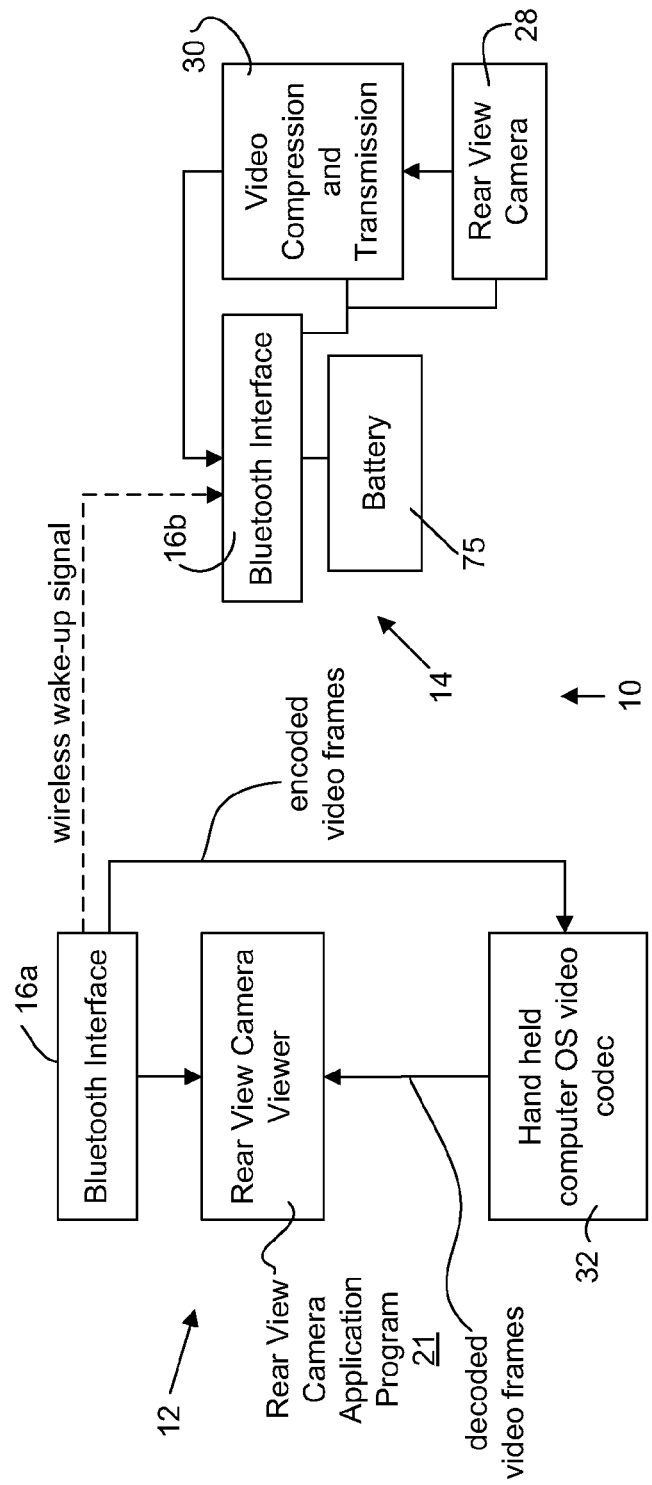
FIG. 11 is a block diagram of a smartphone coupled with a battery-powered rear-view camera peripheral according to another embodiment.

In the embodiment of FIG. 11, the smartphone 12 is coupled with the peripheral 14 using interfaces 16*a* and 16*b*, without involving wireless keyboard commands to control the smartphone 12 to unlock and open up the app 21. In this embodiment, the user unlocks the phone 12 and opens up the app 21. The app 21 then sends the commands to the peripheral 14 that cause it to wake up and to begin sending video.

Figure 12:
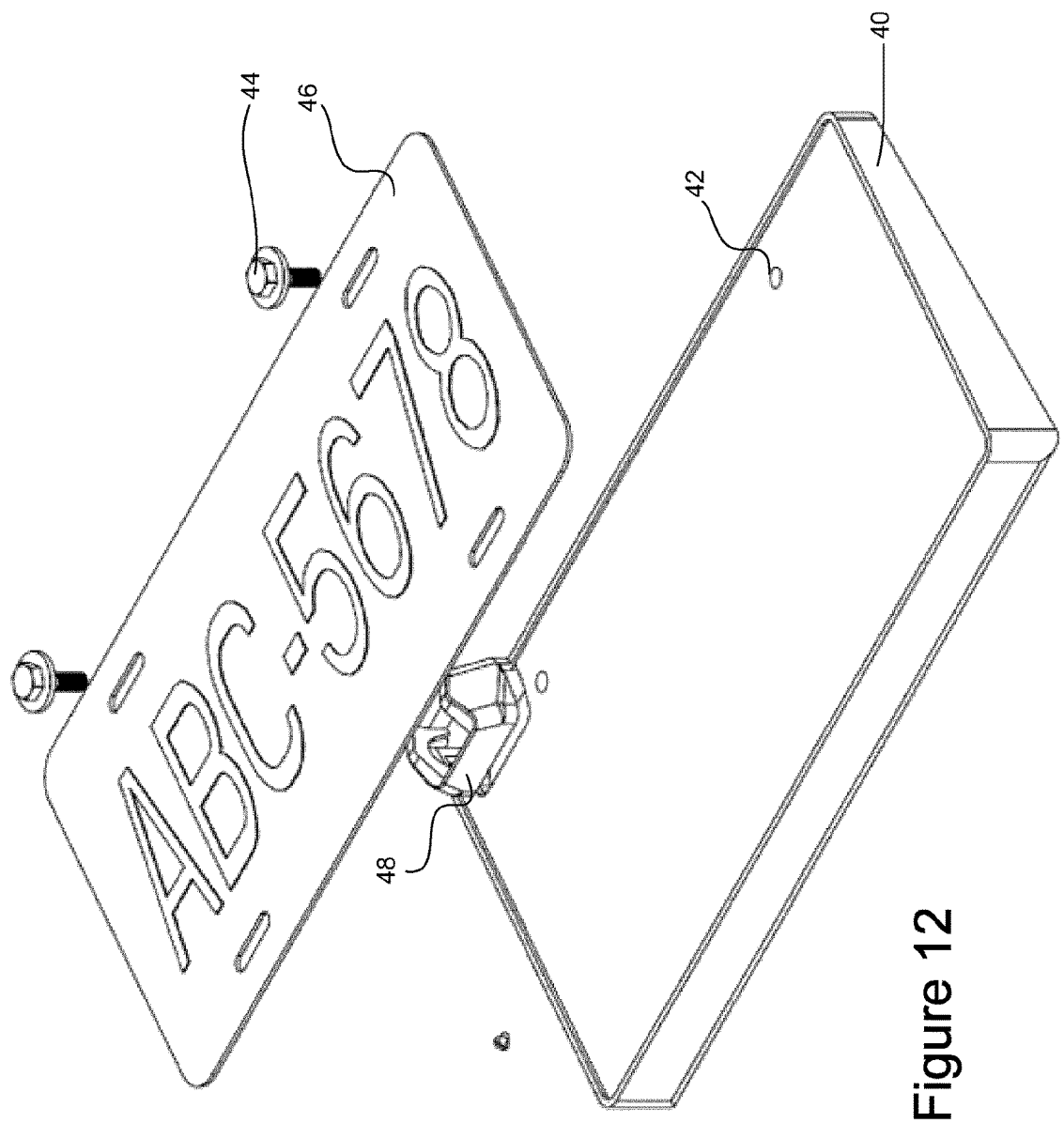
FIG. 12 is an oblique view of an outer face of vehicle license plate frame having a rear view camera mount.

Frame of Peripheral:

FIG. 12 shows a frame 40 of a peripheral 14. The frame 40 has a surface for receiving a license plate 46 and includes holes 42 for mounting the plate 46 to the frame 40 using mounting bolts 44. It will be appreciated that any suitable mounting mechanism, whether clips, bolts, transparent retainer cover, or the like can be used. In the embodiment of FIG. 12, the camera 28 is mounted in a fixed position, namely in the top left corner using a mounting 48. The camera 28 can be arranged to be located in a variable position or in a different fixed position. In the embodiment of FIG. 12, the mounting 48 has a slot into which the plate 46 fits so that the camera 28 fits within the boundaries of the frame 40 of a standard license plate 46. While the plate 46 shown has the dimensions of a North American license plate, it will be appreciated that the frame 40 can be adapted for the plate dimensions of any jurisdiction or vehicle type. Frame 40 can be relatively thin, and the embodiment of FIG. 12 is about 1 cm at the top and expands to about 2 cm at the bottom to have a trapezoidal shape and better accommodate the battery, however, different shapes of battery can fit within a rectangular frame as well.

Figure 13:
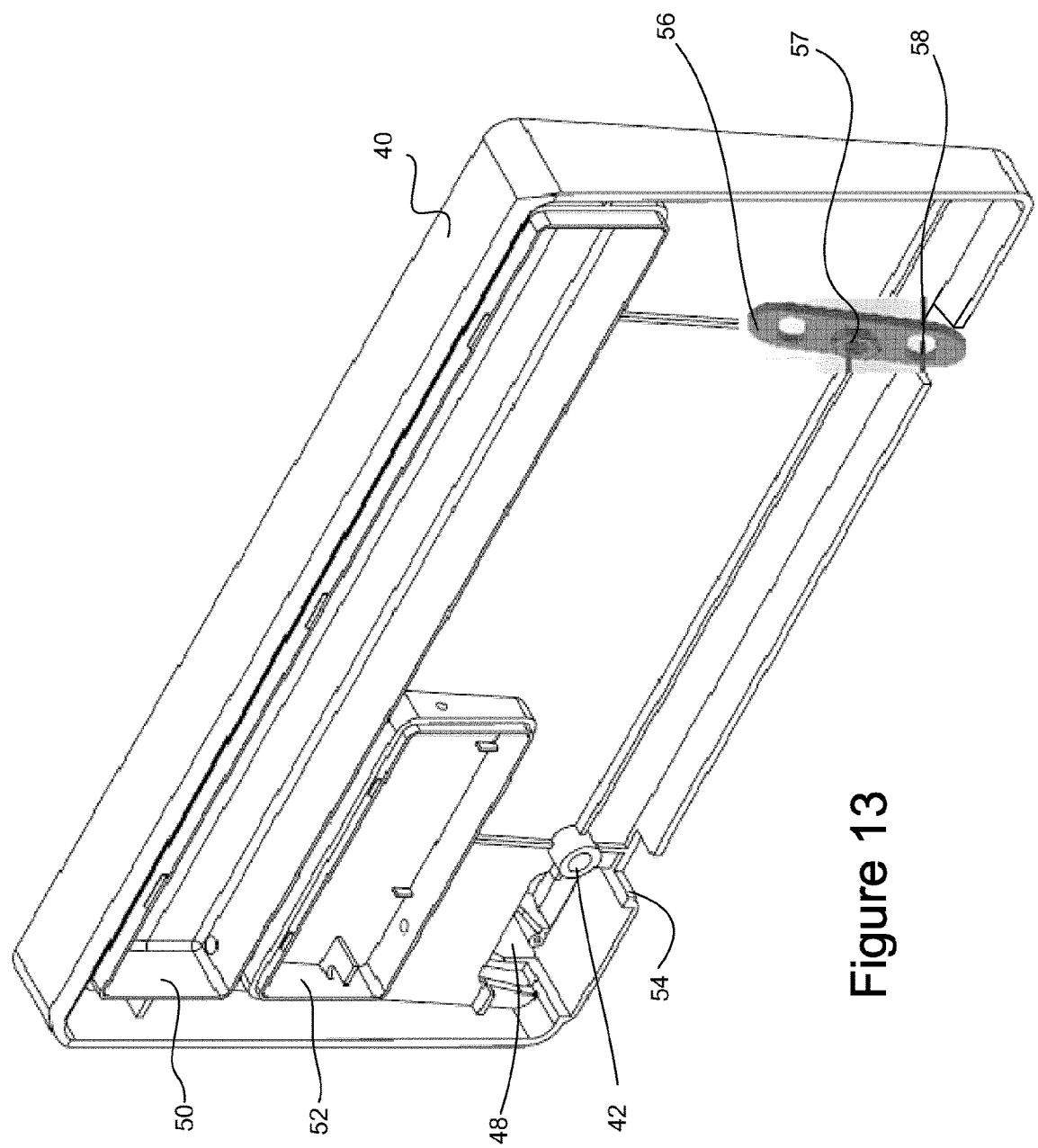
FIG. 13 is an oblique view of an inward face of the frame of FIG. 12 showing a battery compartment, a circuit board compartment, and vehicle mounting bracket.

The vehicle side of the frame 40 is shown in FIG. 13 with the components removed for clarity. The frame 40 is upside down in the view, and the mounting holes 42 are at the bottom. The battery compartment 50 and the circuit board compartment 52 are shown, along with an inner side of the mounting 48. Cut outs 54 near the mounting holes 42 are used for receiving a bracket 56. While a frame 40 can be mounted to the vehicle using the vehicle's mounting nuts for receiving bolts 44 that are a bit longer than usual (by the added thickness of the frame 40), Applicant has found that some vehicles have a plate mounting area that has obstructions, such as trunk handles, spare tires or lights, and an adjustment in height is useful. Furthermore, it is convenient, although optional, to use the vehicle's original mounting bolts to mount the frame to the vehicle and to use separate bolts to mount the plate to the frame 40. Therefore, bracket 56 is an example of a mechanism that allows a vertical adjustment in position for frame 40. The vehicle's original plate mounting bolts can be affixed through hole 58 with the nut 57 positioned either above or below for a higher or a lower position respectively. The bracket is then clamped to the vehicle and the nut 57 is ready to receive bolt 44 through hole 42. Slots 54 prevents the brackets 56 from turning out of position should the bolts attached to the vehicle become loose. This arrangement has been found to avoid conflicts with the car body components in most cases.

Figure 14:
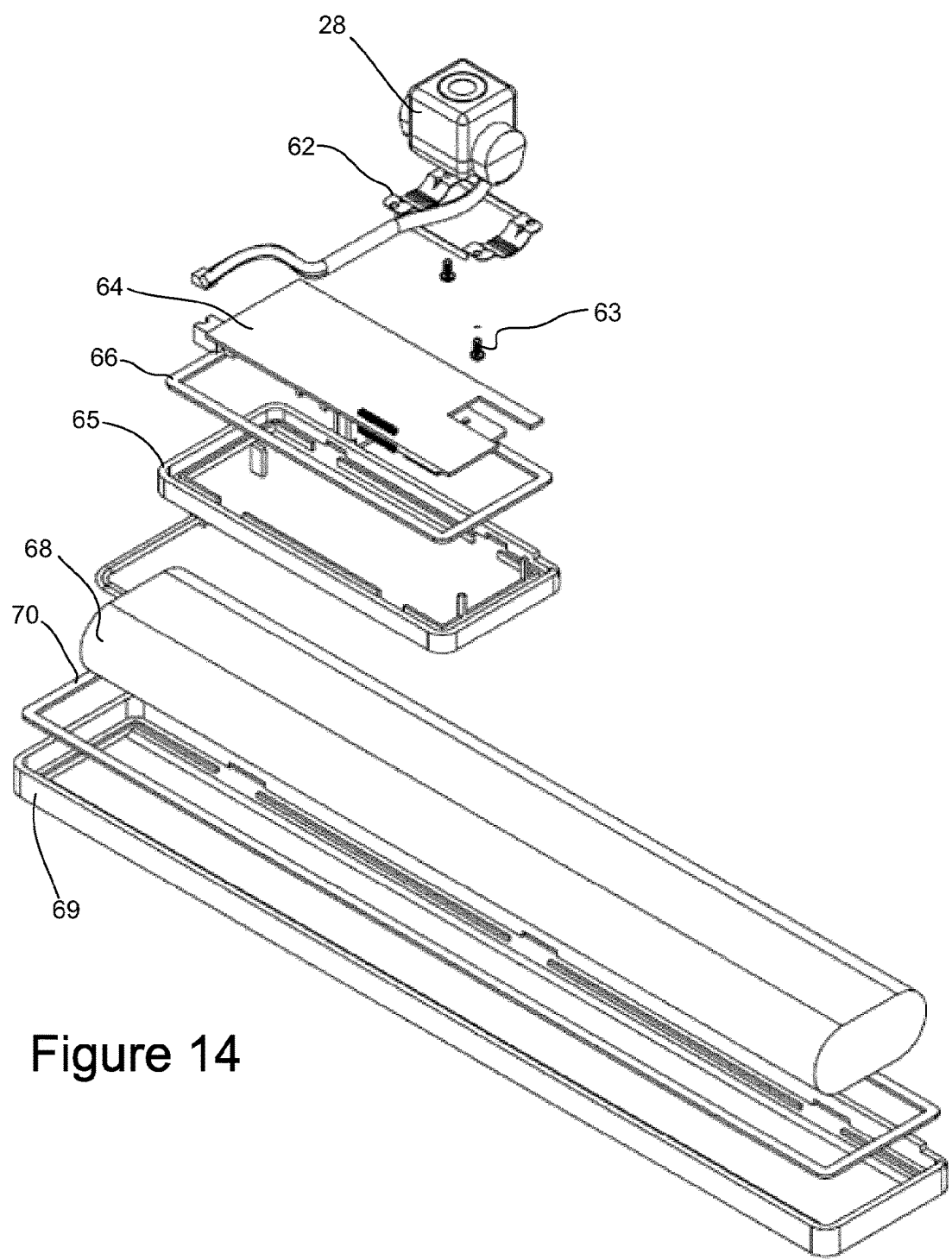
FIG. 14 is an exploded view of a camera, circuit board with the microprocessor and Bluetooth components corresponding to FIG. 1, circuit board compartment cover, battery and battery compartment cover for the embodiment of FIGS. 12 and 13.

As shown in FIG. 14, the peripheral 14 can comprise a camera 28 held by a bracket 62 that allows for an adjustment of the camera tilt. As illustrated, this can be provided by making screws 63 accessible from the vehicle side of the frame 40 where they can be loosened to allow the camera 28 to be adjusted, and then the screws 63 are tightened so that the camera 28 is fixed in its tilt position. The camera 28 is mounted in the mounting 48 with the circular side members rotatable in sleeves in the mounting 48 and the bracket 62 can have teeth engaging complementary teeth in the side members of the housing of the camera 28 to ensure there is no slippage of the camera in its mounting. Other suitable mechanisms to set the tilt angle are possible, and the example given is but one way of securely setting a tilt angle.

The camera 28 is connected to a circuit board 64 that contains the hardware and software components of the peripheral 14, and is to be received in compartment 52 (FIG. 13) and sealed using cover 65 and gasket 66. Protection against the weather and road contamination is important. A battery 68 is connected to the circuit board 64 for power, and is to be received in compartment 50 and sealed using cover 69 and gasket 70. The battery 68 can provide a service life of about two years. A smaller rechargeable or replaceable battery can also be used.

While the embodiment of FIG. 12 is a frame 40 that essentially matches the dimensions of the license plate 46 with only the camera mount 48 overhanging the plate area, it can be desirable to have either an enlarged frame 40 with a border region along at least one side (for example the two vertical sides) to as to accommodate one or more photovoltaic strips that can be used to recharge the battery 68 using sunlight. Alternatively, solar panel strips can be arranged within the plate area thus covering a border region of the license plate 46.

While reference is made herein to a rear-view camera system, it will be appreciated that a vehicle camera can be installed at the sides or front of a vehicle. For example, a school bus can use the license plate mount at the front of the bus to monitor an area at the front of the bus without modifying the camera housing. Triggering of the camera operation could be then done from other signal sources, such as the bus stop lights. For side mountings of a camera, a different housing would be used.

Figure 15:
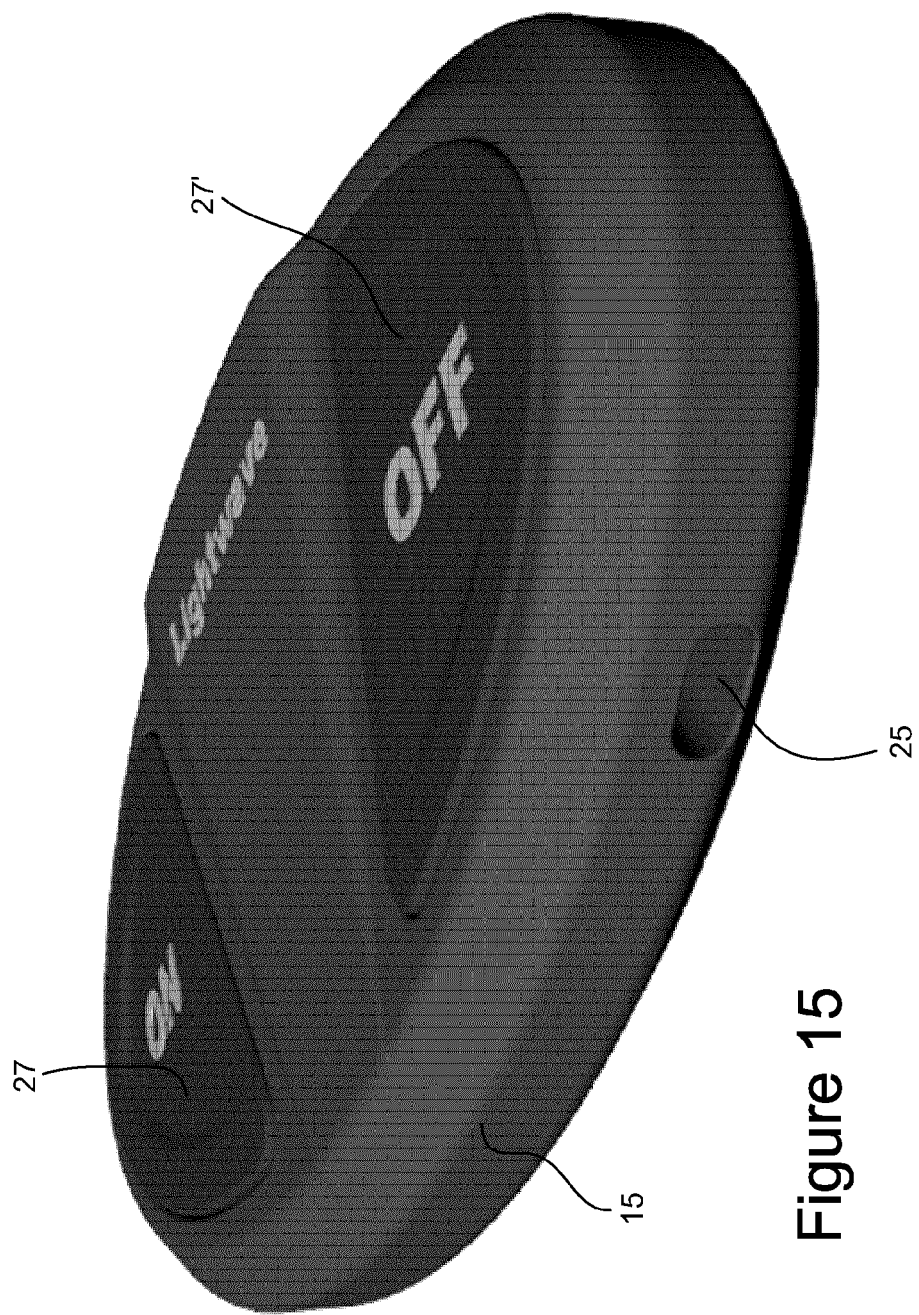
FIG. 15 is an oblique view of a wireless, battery-powered activation unit that can activate a smartphone through Bluetooth keyboard commands and/or a battery-powered peripheral normally in a sleep mode.

FIG. 15 shows a view of a stick-on activation unit 15 that includes a single ON button 27 and a single OFF button 27'. Unit 15 can be powered using a standard button battery (e.g. a Lithium CR2032 type battery) or alternatively, it can be powered from the vehicle (or any other external power) using wire port 25. Unit 15 may include the Bluetooth transceiver chip or another wireless transmitter. For instance, activation unit 15 may have a radio frequency module for transmitting RF activation signals to the peripheral 14. In the example where the unit 15 has a Bluetooth transceiver, the Bluetooth transceiver is paired with the peripheral 14 and maintains a low power connection at all times. When the button 27 of unit 15 is pressed, a signal is sent to the peripheral 14 that causes its Bluetooth component 16*b* to cause the peripheral to wake up and to communicate with the smartphone 12 or the dedicated GPS unit (or any other main computing device) 12'. When the activation signal is an RF signal, pressing the button 27 causes the RF module of unit 15 to send an RF activation signal to the peripheral 14 that is received by the RF module (e.g. RF receiver chip) of the peripheral 14, causing the peripheral 14 to wake up. The unit 15 and the peripheral 14 can remain in this sleep mode with Bluetooth communication established for years without recharging or changing batteries. In the case of button 27', the signal sent to the peripheral indicates that the peripheral 14 is to shut down.

While in the embodiment described above, the peripheral is a rear view camera peripheral, it will be appreciated that other types of peripherals can make use of the features described herein (e.g. a front view camera).

What is claimed is:

1. A vehicle camera peripheral system configured to connect with a smartphone to display on said smartphone, by running a camera viewing application program on said smartphone, images received form said vehicle camera peripheral system, comprising:
   a peripheral unit comprising:
      a camera for producing a stream of images;
      a peripheral unit interface configured to establish a first wireless connection with said smartphone, and to transmit said stream of images produced by said camera to said smartphone via said first wireless connection once said peripheral unit is activated; and
      a mounting for securing said peripheral unit to a vehicle; and
   an activation unit configured to transmit, upon receiving specific external input, an activation signal to at least one of said peripheral unit and said smartphone for causing said peripheral unit to transmit said stream of images to said smartphone;
   wherein said peripheral unit is activated upon receiving one of:
      said activation signal from said activation unit; and
      an activation signal from said smartphone.

2. The camera peripheral system of claim 1, wherein said peripheral unit further comprises a battery for powering said camera when said peripheral unit is activated.

3. The camera peripheral system of claim 1, wherein said activation unit comprises a battery and a mounting for attaching said activation unit to said vehicle.

4. The camera peripheral system of claim 1, said activation unit comprising:
   computer-readable memory configured to store a sequence of keyboard commands for causing said smartphone to run said camera viewing application program; and
   a controller, upon said activation unit receiving said specific external input, configured to retrieve from said memory said sequence of keyboard commands and to send said sequence of keyboard commands to said smartphone.

5. A vehicle camera peripheral comprising:
   a frame having a surface for supporting a license plate;
   at least one compartment for containing a battery and a circuit board having a wireless transmitter and video transmission circuitry, said compartment provided in said frame and positioned behind said license plate supporting surface;
   a camera mounted to said frame and connected to said circuit board; and
   a mounting for connecting said frame to existing license plate fastening devices of a vehicle,
   wherein said wireless transmitter is configured to transmit wirelessly to a display device a stream of image data produced by said camera.

6. The vehicle camera peripheral as defined in claim 5, wherein said mounting is adjustable for connecting said frame at a selected one of a plurality of vertical offset positions.

7. A vehicle camera peripheral comprising:
   a mounting for securing the peripheral to a vehicle;
   a camera producing a stream of video images;
   a wireless transmitter using a wireless channel in communication with a display device which wireless channel can be shared with other peripherals; and
   video compression and transmission circuitry configured to assess an available bandwidth of said wireless channel, wherein said available bandwidth fluctuates in accordance with said other peripherals' shared use of said wireless channel, and to dynamically adapt a video compression rate of said stream of video images in accordance with said available bandwidth.

8. The peripheral as defined in claim 7, wherein said display device can be controlled to stop using said wireless channel with at least one of said other peripherals, and said video compression and transmission circuitry is configured to signal said display device to stop using said wireless channels with said one of said other peripherals.

9. The camera peripheral system of claim 1, wherein said activation unit further comprises a gear shift signaling device for detecting the shifting of a gear stick of a vehicle from a first position to a second position, said gear shift signaling device comprising:
   a property change generator that is adapted to produce a property change when said gear stick is shifted to said second position; and
   a detector configured to detect said property change;
   wherein said activation unit receives as said specific external input an indication of said property change from said gear shift signaling device.

10. The camera peripheral system of claim 9, wherein said property change generator comprises a magnet and a magnetic strip, and said detector is a magnetic field sensor adapted to detect a change in a magnetic field caused by said magnet and said magnetic strip when said magnet and said magnetic strip are placed in proximity as a result of said gear stick shifting to said second position.

11. The camera peripheral system of claim 9, wherein said property change generator comprises a reflective surface and a light source, and said detector is a light sensor adapted to detect light produced by said light source, reflected off said reflective surface, when said reflective surface and said light source are placed in proximity so that light produced by said light source may reflect off said reflective surface as a result of a said gear stick shifting to said second position.

12. The camera peripheral system of claim 9, wherein said activation unit is configured to receive as said specific external input a power signal taken from a back-up lamp of a vehicle when said back-up lamp is turned on.

13. The camera peripheral system of claim 9, wherein said activation unit has a button and is configured to receive the pressing of said button as said specific external input.

14. The camera peripheral system of claim 9, wherein said peripheral unit interface is a Bluetooth interface.

* * * * *